US008992731B2

(12) United States Patent
Akai

(10) Patent No.: US 8,992,731 B2
(45) Date of Patent: Mar. 31, 2015

(54) MODIFIED CELLULOSE FIBERS AND CELLULOSE COMPOSITE THEREOF

(75) Inventor: Hideko Akai, Kanagawa (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 13/323,063

(22) Filed: Dec. 12, 2011

(65) Prior Publication Data

US 2012/0125547 A1 May 24, 2012

Related U.S. Application Data

(63) Continuation of application No. PCT/JP2010/059976, filed on Jun. 11, 2010.

(30) Foreign Application Priority Data

Jun. 12, 2009 (JP) ................................. 2009-140697

(51) Int. Cl.
D21H 11/16 (2006.01)
D21H 11/20 (2006.01)
C08J 5/04 (2006.01)
B82Y 30/00 (2011.01)
C08B 11/16 (2006.01)
C08J 5/00 (2006.01)
C08L 1/08 (2006.01)
D06M 13/11 (2006.01)
D06M 13/152 (2006.01)
D06M 13/184 (2006.01)
D06M 13/395 (2006.01)
D06M 13/507 (2006.01)
D06M 101/06 (2006.01)

(52) U.S. Cl.
CPC ................. C08J 5/045 (2013.01); B82Y 30/00 (2013.01); C08B 11/16 (2013.01); C08J 5/005 (2013.01); C08L 1/08 (2013.01); D06M 13/11 (2013.01); D06M 13/152 (2013.01); D06M 13/1845 (2013.01); D06M 13/395 (2013.01); D06M 13/507 (2013.01); D21H 11/16 (2013.01); D21H 11/20 (2013.01); C08J 2301/08 (2013.01); C08J 2351/02 (2013.01); D06M 2101/06 (2013.01)
USPC ............................... 162/157.1; 8/120; 536/66

(58) Field of Classification Search
CPC ... D21H 5/1272; D21H 5/1281; D21H 11/16; D21H 11/20
USPC .......................... 162/157.1; 8/120; 536/66, 95
See application file for complete search history.

(56) References Cited

U.S. PATENT DOCUMENTS 3,443,879 A 5/1969 Arthur, Jr. et al.
6,967,027 B1* 11/2005 Heux et al. .................... 424/488
7,455,901 B2* 11/2008 Yano et al. .................. 428/292.1
2004/0064900 A1* 4/2004 Scandola et al. ............. 8/115.51
2009/0054552 A1 2/2009 Yano et al.
2009/0264036 A1 10/2009 Yano et al.
2010/0272980 A1 10/2010 Kowata et al.
2011/0274908 A1 11/2011 Kowata et al.

FOREIGN PATENT DOCUMENTS

JP 06-032801 2/1994
JP 2007-051266 3/2007
JP 2008-24788 2/2008
JP 2008-174869 7/2008
JP 2008-248441 10/2008
JP 2008-274461 11/2008
JP 2009-167397 7/2009
JP 2009-299043 12/2009
WO WO 2004/088035 A1 10/2004

OTHER PUBLICATIONS

Perez et al., Structure and Morphology of Cellulose, 2001.*
Kanie et al.,Effect of Paper Strengthening Agents on Strength Enhancement, and Evaluation of Biodegradability, 2005, Journal of Applied Polymer Science, vol. 96, p. 861-866.*
Arthur Jett, Intramolecular Transfer of High Energy in Cellulose, Journal of Applied Polymer Science, 1965, vol. 9, p. 2581-2590.*
Bouchard et al., The effects of ionizing radiation on the cellulose of woodfree paper, 2006, Cellulose,13, 601-610.*
Nair et al., Tensile Properties of Short Sisal Fiber Reinfoirced Polystyrene Composites,1996, Journal of Applied Polymer Science, vol. 60, 1483-1497.*
Extended European Search Report issued Oct. 24, 2012 in Patent Application No. 10786253.4.
International Search Report issued Aug. 10, 2010 in PCT/JP2010/059976 filed Jun. 11, 2010.
Yan Wang, et al.; "A novel thermotropic liquid crystalline—Benzoylated bacterial cellulose"; Carbohydrate Polymers, 2008, vol. 74, Issue 4, pp. 875-879.
Chinese Office Action dated Dec. 4, 2013 issued in corresponding Chinese Patent Application No. 201080025432.8, with English translation, 13 pp.
Office Action issued Apr. 8, 2014 in Japanese Patent Application No. 2011-518592 (with English translation).

* cited by examiner

Primary Examiner — Anthony Calandra
(74) Attorney, Agent, or Firm — Oblon, McClelland, Maier & Neustadt, L.L.P.

(57) ABSTRACT

An object of the invention is to provide cellulose fibers which can give a cellulose composite that renders high transparency, a reduction in linear expansion coefficient, and a high modulus of elasticity possible. The invention relates to: a process for producing modified cellulose fibers which includes a modification reaction step of reacting cellulose with an aromatic compound in an organic acid to thereby modify the cellulose with an aromatic-ring-containing substituent; cellulose fibers modified with aromatic-ring-containing substituent; a dispersion of the cellulose fibers; and a cellulose fiber composite obtained from the same.

16 Claims, No Drawings

MODIFIED CELLULOSE FIBERS AND CELLULOSE COMPOSITE THEREOF

TECHNICAL FIELD

The present invention relates to modified cellulose fibers and composites obtained using the modified cellulose fibers. In particular, the invention relates to a technique in which the modifying substituents and the degree of modification of modified cellulose fibers are regulated to thereby render high heat resistance, ease of fibrillation, and high productivity possible and to enable the modified cellulose fibers to give a cellulose composite having high transparency, a reduced coefficient of linear expansion, a high modulus of elasticity, improved high-temperature strength, etc.

BACKGROUND ART

Composite materials employing cellulose microfibers including bacterial cellulose are being investigated enthusiastically in recent years. It is known that cellulose shows a low coefficient of linear expansion, high modulus of elasticity, and high strength because of the extended chain crystals thereof. Furthermore, cellulose is receiving attention as a material which, when reduced into fine fibers, gives a composite material showing high transparency.

In patent document 1, a composite material having improved moisture absorption characteristics and transparency was obtained by combining cellulose microfibers having a modified surface with another material. Disclosed therein as modifiers for the surface modification are aliphatic modifiers. The document discloses that acetyl group and methacryloyl group are especially preferred.

Patent document 2 discloses nonwoven fabric constituted of modified fibers into which a compound having an aromatic ring structure has been introduced as a compound for regulating optical anisotropy.

Furthermore, non-patent document 1 discloses benzoylated bacterial cellulose which shows thermotropic liquid crystallinity.

PRIOR-ART DOCUMENTS

Patent Documents

Patent Document 1: JP-A-2007-51266
Patent Document 2: JP-A-2008-274461

Non-Patent Document

Non-Patent Document 1: *Carbohydrate Polymers*, Vol. 74, Issue 4, pp. 875-879 (2008)

SUMMARY OF THE INVENTION

Problems that the Invention is to Solve

The process for producing nonwoven fabric of cellulose microfibers (cellulose sheet) which is specifically disclosed in patent document 1 is a process in which an aqueous suspension of cellulose microfibers obtained through mechanical fibrillation is filtered through a glass filter and dehydrated to form a film.

However, cellulose composite material production conducted by the present inventors in accordance with the process disclosed in patent document 1 revealed that the filtration for dehydration of the aqueous suspension of cellulose microfibers in cellulose sheet production requires much time and practical productivity is not obtained.

The nonwoven fabric (cellulose sheet) specifically disclosed in patent document 2 is produced through the reaction of an aromatic-ring-containing compound with cellulose in the presence of N,N-dimethylformamide, ethyl Cellosolve, or the like.

However, cellulose sheet production conducted by the present inventors in accordance with the process disclosed in patent document 2 revealed that the crystal structure of the cellulose is clearly destroyed, resulting in a decrease in the proportion of the I-type crystal structure. Cellulose sheets having a low proportion of the I-type crystal structure have poor heat resistance. It is therefore thought that even when this cellulose sheet is combined with a polymeric material, the resultant composite material does not have a low coefficient of linear expansion and a high modulus of elasticity and is reduced in strength upon heating by the influence of gas generation, etc.

Furthermore, the benzoylated bacterial cellulose obtained by the method disclosed in non-patent document 1 has a glass transition temperature and is hence thought to be amorphous. Even when this cellulose is combined with a polymeric material, the resultant composite material does not have a low coefficient of linear expansion, high modulus of elasticity, and high strength.

An object of the invention, which has been achieved in view of the state of prior-art techniques, is to provide cellulose fibers which render high heat resistance, ease of fibrillation, and high productivity possible. Another object of the invention is to render high transparency, a reduction in linear expansion coefficient, and a high modulus of elasticity possible when the cellulose fibers are converted to a composite.

Means for Solving the Problems

The present inventors diligently made investigations in order to overcome the problems. As a result, the inventors have found that high heat resistance, ease of fibrillation, and high productivity can be attained by regulating the average fiber diameter, crystallinity, modifying substituents, and degree of modification of modified cellulose fibers or by using an organic acid as a solvent when a reaction for modification is conducted.

Namely, essential points of the invention are as follows.

[1] A process for producing modified cellulose fibers which comprises a modification reaction step of reacting cellulose with an aromatic compound in a solvent to thereby modify the cellulose with an aromatic-ring-containing substituent, wherein an organic acid is used as the solvent in the modification reaction step.

[2] The process for producing modified cellulose fibers according to [1], wherein the aromatic-ring-containing substituent is one or more kinds of groups selected from the group consisting of aromatic-ring-containing ester groups, aromatic-ring-containing ether groups, and aromatic-ring-containing carbamate groups.

[3] The process for producing modified cellulose fibers according to [1] or [2], wherein the degree of modification with the aromatic-ring-containing substituent is 10% by mole or more based on all hydroxyl groups of the cellulose.

[4] A process for producing a sheet of modified cellulose fibers which comprises: a modification reaction step of reacting cellulose with an aromatic compound in a cellulose dispersion comprising the cellulose and an organic acid to thereby modify the cellulose with aromatic-ring-containing substituent; and a papermaking step.

[5] The process for producing a sheet of modified cellulose fibers according to [4], wherein the aromatic-ring-containing substituent is one or more kinds of groups selected from the group consisting of aromatic-ring-containing ester groups, aromatic-ring-containing ether groups, and aromatic-ring-containing carbamate groups.

[6] The process for producing a sheet of modified cellulose fibers according to [4] or [5], wherein the degree of modification with the aromatic-ring-containing substituents is 10% by mole or more based on all hydroxyl groups of the cellulose.

[7] A process for producing a cellulose fiber composite, the process comprising a step of making a composite of a matrix, and modified cellulose fibers obtained by the process according to any one of [1] to [3] or a sheet of modified cellulose fibers obtained by the process according to any one of [4] to [6].

[8] A dispersion of modified cellulose fibers which is a dispersion of cellulose fibers having a cellulose I type crystal structure in which 10% by mole or more of all hydroxyl groups of the cellulose have been modified with an aromatic-ring-containing substituent, wherein the cellulose fibers give a wide-angle X-ray diffraction image in which the ratio of the "average diffraction intensity in the scanning angle range of 18-19 degrees" to the "intensity of a diffraction peak derived from cellulose I type crystals in the scanning angle range of 20-24 degrees", is 0.8 or less.

[9] The dispersion of modified cellulose fibers according to [8], wherein the cellulose fibers have an average fiber diameter of 100 nm or less.

[10] The dispersion of modified cellulose fibers according to [8] or [9], wherein the aromatic-ring-containing substituent is one or more kinds of groups selected from the group consisting of aromatic-ring-containing ester groups, aromatic-ring-containing ether groups, and aromatic-ring-containing carbamate groups.

[11] Modified cellulose fibers which are cellulose fibers having a cellulose I type crystal structure in which 10% by mole or more of all hydroxyl groups of the cellulose have been modified with an aromatic-ring-containing substituent, wherein the cellulose fibers give a wide-angle X-ray diffraction image in which the ratio of the "average diffraction intensity in the scanning angle range of 18-19 degrees" to the "intensity of a diffraction peak derived from cellulose I type crystals in the scanning angle range of 20-24 degrees", is 0.8 or less.

[12] The modified cellulose fibers according to [11], which have an average fiber diameter of 100 nm or less.

[13] The modified cellulose fibers according to [11] or [12], wherein the aromatic-ring-containing substituent is one or more kinds of groups selected from the group consisting of aromatic-ring-containing ester groups, aromatic-ring-containing ether groups, and aromatic-ring-containing carbamate groups.

[14] A sheet of modified cellulose fibers which comprises cellulose fibers having an average fiber diameter of 100 nm or less and having a cellulose I type crystal structure in which 10% by mole or more of all hydroxyl groups of the cellulose have been modified with an aromatic-ring-containing substituent, wherein the sheet of modified cellulose fibers, when examined after making the composite material shown under (1) below, having a haze measured with illuminant C of 3 or less.

(1) A composite material obtained by: immersing the cellulose fiber sheet having a thickness regulated so that the sheet has a basis weight of 40 g/m$^2$, in a solution prepared by mixing 96 parts by weight of bis(methacryloyloxymethyl)tricyclo[5.2.1.0$^{2,6}$]decane with 6 parts by weight of pentaerythritol tetrakis(β-thiopropionate), 0.05 parts by weight of 2,4,6-trimethylbenzoyldiphenylphosphine oxide, and 0.05 parts by weight of benzophenone; holding the sheet under vacuum overnight; subsequently sandwiching the sheet between two glass plates; performing a curing using an electrodeless mercury lamp; thereafter separating the sheet from the glass plates; and then heating the sheet in a 190° C. vacuum oven for 4 hours.

[15] A cellulose fiber composite which comprises a matrix and either the modified cellulose fibers according to any one of [11] to [13] or the sheet of modified cellulose fibers according to [14].

[16] A cellulose fiber composite which comprises a matrix and cellulose fibers having a cellulose I type crystal structure in which 10% by mole or more of all hydroxyl groups of the cellulose have been modified with an aromatic-ring-containing substituent, wherein the cellulose fibers give a wide-angle X-ray diffraction image in which the ratio of the "average diffraction intensity in the scanning angle range of 18-19 degrees" to the "intensity of a diffraction peak derived from cellulose I type crystals in the scanning angle range of 20-24 degrees" is 0.8 or less.

Effects of the Invention

According to the invention, high heat resistance, ease of fibrillation, and high productivity can be rendered possible by regulating the average fiber diameter, crystallinity, modifying substituents, and degree of modification of modified cellulose fibers or by using an organic acid as a solvent when a reaction for modification is conducted. In addition, the cellulose fibers thus modified can give a cellulose composite which has high transparency, colorlessness, a reduced coefficient of linear expansion, a high modulus of elasticity, and improved high-temperature strength. Furthermore, use of the cellulose fibers modified with aromatic-ring-containing substituents produces an effect that affinity for resins, in particular, affinity for resins having aromatic rings, is enhanced.

Modes for Carrying Out the Invention

Embodiments of the invention will be explained below in detail. However, the invention should not be construed as being limited to the following embodiments, and can be variously modified within the range of the essential points thereof.

I. Process of the Invention for Producing Modified Cellulose Fibers

The process of the invention for producing a modified cellulose fibers includes a modification reaction step in which cellulose is reacted with an aromatic compound in a solvent to thereby modify the cellulose with aromatic-ring-containing substituents, and is characterized in that an organic acid is used as the solvent in the modification reaction.

[Cellulose]

The term "cellulose" in the invention means a product obtained by removing impurities from a cellulose-containing substance, such as those shown below, through general purification.

<Cellulose-Containing Substances>

Examples of the cellulose-containing substance include ligneous materials including softwood and hardwood, cotton such as cotton linters and cotton lint, cakes resulting from squeezing of sugar canes and sugar beets, bast fibers of, for example, hemp, ramie, jute, and kenaf, venous fibers of, for example, sisal and pineapple, petiolar fibers of, for example, Manila hemp and banana, fruit fibers of, for example, coconut palm, cane fibers of, for example, bamboo, bacterial cellulose, which is produced by bacteria, seaweeds such as Valoniaceae and Cladophorales, and tunicae of sea squirts. These natural celluloses are preferred because the celluloses are highly crystalline and hence impart a low coefficient of linear expansion and a high modulus of elasticity. Bacterial cellulose is preferred from the standpoint that cellulose fibers having a fine fiber diameter are easy to obtain therefrom. Cotton also is preferred from the standpoints that cellulose fibers having a fine diameter are easy to obtain therefrom and that the raw material is easily available. Furthermore, cellulose fibers having a fine diameter are obtained also from ligneous materials including softwood and hardwood. In addition, such ligneous materials are the most abundant biomass resources on the globe and are sustainable resources which are said to be produced in an amount of about seventy billion tons or more annually. Ligneous materials hence contribute considerably to a reduction of carbon dioxide emission, which affects global warming, and are superior from the standpoint of profitability. Such a cellulose-containing substance is subjected to general purification to obtain the raw cellulose material for use in the invention.

<Fiber Diameter>

The fiber diameter of the cellulose to be used in the invention is not particularly limited, and may be from several micrometers to several millimeters in terms of number-average fiber diameter. Cellulose fibers which have undergone general purification have a fiber diameter of about several millimeters, while fibers obtained by cellulose fibrillation have a fiber diameter of about several nanometers. For example, in the case of cellulose obtained by purifying a raw material having a size of several centimeters, e.g., chips, it is preferred that the cellulose should be subjected to a mechanical treatment with a macerator, e.g., a refiner or a beater, to regulate the number-average fiber diameter thereof to about several millimeters. Methods for determining number-average fiber diameter are not particularly limited. For example, the number-average fiber diameter of cellulose can be determined by examining the cellulose with an SEM, TEM, etc., drawing a diagonal on the photograph, randomly extracting 12 fiber images present in the vicinity of the diagonal, excluding the thickest and the thinnest fiber images therefrom, and averaging the diameters of the remaining 10 fiber images.

<Methods for Purifying Cellulose-Containing Substance>

The cellulose to be used in the invention is obtained by purifying, by an ordinary method, a cellulose-containing substance of any of the origins shown above. For example, a cellulose-containing substance is degreased with benzene-ethanol, subsequently delignified by Wise's method, and then subjected to a hemicellulose removal treatment with an alkali to thereby obtain cellulose. Alternatively, cellulose is obtained by a general process for producing a chemical pulp, for example, a process for producing kraft pulp, sulfide pulp, or alkali pulp. In general, a cellulose-containing substance is heat-treated with a digester to conduct treatments including delignification and is further subjected to bleaching, etc.

[Modification of Cellulose]

In the invention, cellulose is modified under such conditions that an organic acid is present as a solvent. The "modification" means that hydroxyl groups of the cellulose react with a chemical modifier and are thereby modified chemically.

(Modifying Substituents)

The functional groups to be introduced into the cellulose through chemical modification are aromatic-ring-containing substituents. Modification with aromatic-ring-containing substituents is preferred from the standpoint of attaining high heat resistance, ease of fibrillation, and high productivity.

Investigations made by the inventors revealed that cellulose modified with aromatic-ring-containing substituents is superior to the unmodified cellulose or to cellulose modified with aliphatic-containing substituents because the former cellulose has excellent heat resistance and highly easily fibrillated and, in particular, has excellent productivity.

The aromatic-ring-containing substituents are substituents derived from aromatic hydrocarbon compounds, heterocyclic aromatic compounds, and non-benzenoid aromatic compounds. The aromatic hydrocarbon compounds are benzene and compounds each formed by the fusion of 2-12 benzene rings, such as naphthalene and anthracene. The upper limit of the fused benzene rings preferably is 6 or less. The heterocyclic aromatic compounds are 5- to 10-membered monocyclic heterocycles, such as furan, thiophene, pyrrole, and imidazole, or compounds each formed by the fusion of 2-12 such heterocycles. The number of the fused heterocycles preferably is 6 or less. Examples of the non-benzenoid aromatic compounds include annulenes, cyclopentadienyl anions, cycloheptatrienyl cations, tropone, metallocenes, acepleiadylene, and the like. Preferred of these are substituents derived from aromatic hydrocarbon compounds and heterocyclic aromatic compounds. More preferred are substituents derived from aromatic hydrocarbon compounds. In particular, substituents derived from benzene, naphthalene, and anthracene are preferred from the standpoint of availability of the starting material.

Those aromatic-ring-containing substituents may be ones in which hydrogen atoms thereof have been replaced with alkyl groups having 1-12 carbon atoms. Furthermore, the aromatic-ring-containing substituents each may be configured of two or more moieties of any of the aromatic hydrocarbon compounds, heterocyclic aromatic compounds, and non-benzenoid aromatic compounds, the moieties having been connected to each other with a single bond or an alkyl group having 1-3 carbon atoms.

The connecting group which bonds the aromatic ring of each aromatic-ring-containing substituent to the cellulose is not particularly limited so long as the connecting group is a group obtained as a result of reaction with a hydroxyl group of the cellulose. However, ester groups, ether groups, and carbamate groups are preferred, and ester groups are especially preferred.

Namely, the aromatic-ring-containing substituents as the modifying substituents to be introduced into the modified cellulose of the invention preferably are benzoyl, naphthoyl, anthroyl, and the like. Especially preferred is benzoyl.

(Chemical Modifier)

Methods for the modification are not particularly limited. Examples thereof include a method in which cellulose is reacted with a chemical modifier such as those shown below. Although the reaction between these in the invention is conducted under such conditions that an organic acid is present as a solvent, it is possible to further use another solvent, a catalyst, etc. according to need and to conduct heating, pressure reduction, etc.

Examples of the kind of chemical modifier include: acids, acid anhydrides, and halogenation reagents in the case of forming ester groups; phenol compounds, phenoxysilanes, and cyclic ether compounds, e.g., oxirane (epoxy), in the case of forming ether groups; and isocyanate compounds in the case of forming carbamate groups. One of these chemical modifiers may be used, or two or more thereof may be used.

Examples of the acids serving as chemical modifiers for forming ester groups include benzoic acid and naphthalenecarboxylic acid, and examples of the acid anhydrides include benzoic anhydride and phthalic anhydride. Examples of the halogenation reagents include benzoyl halides and naphthoyl halides.

Examples of the phenol compounds serving as chemical modifiers for forming ether groups include phenol and naphthol. Examples of the chemical modifiers include phenoxysilanes and cyclic ether compounds such as phenyloxirane (epoxy).

Examples of the isocyanate compounds serving as chemical modifiers for forming carbamate groups include phenyl isocyanate.

Especially preferred of these are benzoyl halides, naphthoyl halides, and benzoic anhydride. One of these chemical modifiers may be used, or two or more thereof may be used.
(Degree of Chemical Modification)

The term "degree of chemical modification" herein means the proportion of chemically modified hydroxyl groups in all hydroxyl groups of the cellulose. The degree of chemical modification can be determined by the following titration method.
<Determination Method>

A 0.05-g portion of modified cellulose which has been dried is precisely weighed out, and 6 mL of methanol and 2 mL of distilled water are added thereto. This mixture is stirred at 60-70° C. for 30 minutes. Thereafter, 10 mL of a 0.05-N aqueous solution of sodium hydroxide is added thereto. The resultant mixture is stirred at 60-70° C. for 15 minutes and then further stirred at room temperature for a day. This mixture is titrated with a 0.02-N aqueous hydrochloric acid solution using phenolphthalein.

The number of moles Q of the substituents introduced by the chemical modification is determined from the amount Z (mL) of the 0.02-N aqueous hydrochloric acid solution required for the titration, using the following equation.

$$Q \text{ (mol)}=0.05 \text{ (N)} \times 10 \text{ (mL)}/1000-0.02 \text{ (N)} \times Z \text{ (mL)}/1000$$

A relationship between the number of moles Q of the substituents and the degree of chemical modification X (mol %) is calculated using the following equation (cellulose= $(C_6O_5H_{10})_n=(162.14)_n$; number of hydroxyl groups per repeating unit=3; molecular weight of OH=17). In the following, T is the molecular weight of the substituent.

$$\frac{\text{sample amount}}{162.14 + (T-17) \times \frac{3X}{100}} = \frac{Q}{\frac{3X}{100}} \quad \text{[Math. 1]}$$

This equation is solved as shown below.

$$x = \frac{100}{3} \times \frac{162.14 \times Q}{\{\text{sample amount} - Q \times (T-17)\}} \quad \text{[Math. 2]}$$

In the process of the invention for producing modified cellulose fibers, cellulose is modified with aromatic-ring-containing substituents and cellulose having a given degree of modification is obtained by regulating the degree of modification or regulating the method of modification reaction. In the case where the degree of modification is regulated, the process is characterized in that the degree of chemical modification is 10% by mole or higher based on all hydroxyl groups of the cellulose. The degree of chemical modification is preferably 11% by mole or higher, especially preferably 15% by mole or higher, and is generally 60% by mole or less, preferably 55% by mole or less, more preferably 50% by mole or less, even more preferably 45% by mole or less, especially preferably 40% by mole or less.

The expression "regulating the degree of modification or regulating the method of modification reaction" means, for example, that the amount of a chemical modifier to be added for all hydroxyl groups of the cellulose is regulated or that the reaction time and temperature of the modification reaction are regulated.

The chemical modification is preferred because the cellulose fibers come to have an elevated heat decomposition temperature and enhanced heat resistance and show reduced thermal discoloration, through the chemical modification. In particular, the modification reaction according to the invention yields modified cellulose in which the I-type crystal structure of the cellulose is satisfactorily maintained and which has excellent heat resistance. The reason for this is thought to be as follows. In the modification reaction according to the invention, the fibers are swelled, without destroying the I-type crystal structure, by using an organic acid as a solvent during the reaction, and are modified in this state. More even modification hence is rendered possible. Incidentally, heat decomposition temperature is measured by the method shown below.

In case where the degree of this chemical modification is too low, enhanced discoloration occurs when the modified cellulose fibers are heated in a post-treatment during composite formation. In case where the degree of chemical modification is too high, the crystal structure of the cellulose fibers is destroyed to reduce the crystallinity thereof, resulting in a problem that the composite material to be obtained has an increased coefficient of linear expansion. Too low or too high degrees of chemical modification hence are undesirable. In addition, too low degrees of chemical modification are undesirable because the results are enhanced hydrophilicity, a prolonged filtration period for dehydration, and an increased moisture content of the cellulose fibers obtained. Especially when a ligneous material was used as a raw material for cellulose, low values of the degree of chemical modification are undesirable because the modified cellulose fibers discolor when heated in a post-treatment during composite formation. Furthermore, investigations made by the inventors revealed that modified cellulose which has been obtained through modification with aromatic-ring-containing substituents and which has a degree of chemical modification within that range is easy to fibrillate and gives a cellulose composite having enhanced transparency. Although reasons therefor have not been elucidated in detail, it is thought that the cellulose chains have become easy to separate from one another probably because of steric hindrance of the substituents.
<Heat Decomposition Temperature>

The modified cellulose according to the invention has a heat decomposition temperature of preferably 300° C. or higher, more preferably 335° C. or higher. Although there is no particular upper limit, the heat decomposition temperature thereof is generally 400° C. or lower. Too low heat decomposition temperatures pose a problem that discoloration due to heat decomposition is enhanced. The modified cellulose fibers of the invention have satisfactory heat resistance because the fibers have a high heat decomposition temperature as described above. The reason for this is presumed to be that modification at the 6-position hydroxyl group inhibits the main chain from splitting.

Heat decomposition temperature is determined by regulating the moisture content of the modified cellulose by placing the modified cellulose at a temperature of 23° C. and a humidity of 50% for 48 hours or more and then subjecting this modified cellulose to an examination with a TG-DTA (apparatus for simultaneously conducting differential thermal analysis and thermo-gravimetry) in which the modified cellulose is heated from room temperature to 600° C. at 10° C./min in nitrogen to obtain a TG and the intersection of tangents determined from the TG curve is taken as the heat decomposition temperature.

[Process for Producing Dispersion of Modified Cellulose Fibers]

In the process of the invention for producing a dispersion of modified cellulose fibers, cellulose is modified with aromatic-ring-containing substituents and a dispersion of cellulose having a given degree of modification is obtained by regulating the degree of modification or regulating the method of modification reaction. In the case where the dispersion of modified cellulose fibers obtained by the production process of the invention is converted to a cellulose composite to be used in a transparent application, it is preferred to fibrillate the cellulose into microfibers. Cellulose obtained through purification may be subjected to the modification, or the modification may be conducted after cellulose has been fibrillated into microfibers or after cellulose fibers have been formed into, for example, a sheet. For evenly modifying the surface of microfibers, use may be made of a method in which cellulose is fibrillated into microfibers and then modified or a method in which cellulose fibers are formed into, for example, a sheet and then modified. However, a method in which unfibrillated cellulose obtained through purification is modified and then fibrillated is preferred from the standpoint of productivity because the modified cellulose is easy to fibrillate and requires a shorter filtration period for solvent removal.

This process for producing modified cellulose fibers is explained in more detail.

In the case where cellulose which has not been formed into a sheet or the like is modified, the cellulose obtained through purification may be modified or may be fibrillated into microfibers and then modified. However, the case where modification is conducted after fibrillation into microfibers, solvent removal requires labor. It is therefore preferred to modify unfibrillated cellulose obtained through purification. In this case, the chemical modification may be conducted by an ordinary method. However, since cellulose obtained through purification usually is in a hydrous state, it is important that the water should be replaced with a reaction solvent or the like to minimize reaction between the chemical modifier and the water. In case where the cellulose is dried in order to remove the water, the size reduction into microfibers to be conducted later becomes less apt to proceed. It is therefore undesirable to add a drying step.

The chemical modification can be performed by an ordinary method. Namely, the chemical modification can be accomplished by reacting the cellulose with a chemical modifier in accordance with an ordinary method. In the production process of the invention, an organic acid is used as a solvent in this modification. However, another solvent and a catalyst may be used according to need, and heating, pressure reduction, etc. may be conducted.

The amount of the chemical modifier is not particularly limited, and varies depending on the kind of the chemical modifier. Usually, however, the amount thereof is desirably 0.01 time or more, preferably 0.05 times or more, and is desirably 100 times or less, preferably 50 times or less, the amount of the hydroxyl groups of the cellulose, in terms of the number of moles.

(Solvent)

"Organic acid" is a general term for acids of organic compounds. The organic acid mainly is a carboxylic acid or a sulfonic acid. Examples of the carboxylic acid include aliphatic carboxylic acids such as formic acid, acetic acid, propionic acid, butyric acid, and valeric acid, aliphatic unsaturated carboxylic acids such as oleic acid and linoleic acid, aliphatic dicarboxylic acids such as oxalic acid, malonic acid, and succinic acid, aromatic carboxylic acids such as benzoic acid and phthalic acid, oxocarboxylic acids such as pyruvic acid, and carboxylic acids such as lactic acid, malic acid, and citric acid. Examples of the sulfonic acid include aliphatic sulfonic acids such as methylsulfonic acid and ethylsulfonic acid, aliphatic unsaturated sulfonic acids, aliphatic disulfonic acids, and aromatic sulfonic acids such as benzenesulfonic acid and toluenesulfonic acid.

Especially preferred among such organic acids are organic acids having an acid dissociation constant pKa of 5.0 or less, preferably 4.8 or less. It is preferred that the pKa thereof should be 0.1 or higher, preferably 1.0 or higher.

Examples of the organic acids having an acid dissociation constant pKa of 5.0 or less include formic acid, acetic acid, propionic acid, butyric acid, oleic acid, linoleic acid, oxalic acid, malonic acid, succinic acid, benzoic acid, phthalic acid, pyruvic acid, lactic acid, malic acid, citric acid, methylsulfonic acid, ethylsulfonic acid, benzenesulfonic acid, and toluenesulfonic acid.

Especially preferred of those organic acids are aliphatic organic acids. Such organic acids may be acids having one or two acid groups or having more acid groups, so long as the acids are aliphatic. It is preferred that these aliphatic organic acids should be carboxylic acids. In these aliphatic carboxylic acids, the aliphatic chains each have preferably 1-7 carbon atoms, more preferably 1-5 carbon atoms. Especially preferred of these are acetic acid and oxalic acid.

By using an organic acid such as, for example, acetic acid, modification is made to proceed evenly on the cellulose. It is thought that this modification facilitates the fibrillation to be conducted later and enables the cellulose fibers to have high heat resistance and high productivity.

The amount of the solvent is not particularly limited. Usually, however, the amount thereof is desirably 0.5 times or more, preferably 1 time or more, and is desirably 200 times or less, preferably 100 times or less, the weight of the cellulose.

It is preferred that the other solvent which can be used in combination with the organic acid should be an organic solvent which does not inhibit the chemical modification reaction.

Also preferred is an organic solvent which is compatible with the organic acid and with the catalyst that will be described later. Examples of this organic solvent include organic solvents such as acetone and pyridine. In the case where the other solvent is used in combination with the organic acid, the mixing ratio of the other solvent is not limited so long as the solvent and the acid are compatible with each other and the catalyst which will be described later is compatible therewith. However, it is preferred that the proportion of the other solvent in all solvents should be generally about 1 vol % or more, and that the proportion thereof should be generally 50 vol % or less, desirably 40 vol % or less, especially 30 vol % or less.

(Catalyst)

As the catalyst, it is preferred to use a basic catalyst such as pyridine, triethylamine, sodium hydroxide, or sodium acetate or an acidic catalyst such as acetic acid, sulfuric acid, or perchloric acid. The amount of the catalyst is not particularly limited, and varies depending on the kind thereof. Usually, however, the amount thereof is desirably 0.01 time or more, preferably 0.05 times or more, and is desirably 100 times or less, preferably 50 times or less, the amount of the hydroxyl groups of the cellulose, in terms of the number of moles.
(Temperature Conditions)

With respect to temperature conditions, too high temperatures may cause the cellulose to suffer yellowing, a decrease in polymerization degree, etc., while too low temperatures result in a decrease in reaction rate. Consequently, a preferred temperature range is 10-130° C. The reaction time may be from several minutes to tens of hours, although the reaction time depends on the chemical modifier and the degree of chemical modification.

It is preferred that after the chemical modification is conducted in the manner described above, the cellulose should be sufficiently washed with an organic solvent and water in order to terminate the reaction. In case where the unreacted chemical modifier remains, this is undesirable because the remaining chemical modifier will be causative of discoloration later or be problematic when the cellulose is combined with a resin.

With respect to chemical modification of a molded object, e.g., a sheet, the sheet produced is subjected to replacement with an organic solvent, e.g., an alcohol, and this sheet may be chemically modified after having been dried or may be chemically modified without being dried. However, to conduct chemical modification after the drying is preferred because this chemical modification proceeds at a higher reaction rate. In the case where the drying is conducted, the sheet may be dried with air blowing or vacuum-dried, or may be dried with pressing. Furthermore, heating may be conducted.

The chemical modification of the sheet also can be conducted by an ordinary method, and may be performed in the manner described above.
(Washing)

It is preferred that after the chemical modification is conducted, the cellulose should be sufficiently washed with water in order to terminate the reaction. In case where the unreacted chemical modifier remains, this is undesirable because the remaining chemical modifier will be causative of discoloration later or be problematic when the cellulose is combined with a resin. It is also preferred that after the sufficient washing with water, the residual water should be replaced with an organic solvent, e.g., an alcohol. In this case, the replacement can be easily accomplished by keeping the sheet immersed in an organic solvent, e.g., an alcohol.
[Fibrillation Step]

It is necessary in the invention that for obtaining a transparent cellulose composite, the cellulose should be fibrillated into microfibers. A fibrillation step is conducted in order to obtain microfibers, and methods for this step are explained. Cellulose obtained through purification may be subjected to the fibrillation step, or the fibrillation step may be conducted after cellulose has been chemically modified. However, the method in which unfibrillated cellulose obtained through purification is modified and then fibrillated is preferred from the standpoint of productivity because the modified cellulose is easy to fibrillate and requires a shorter filtration period for solvent removal.

There are no particular limitations on specific methods for the fibrillation step. Examples of the methods include a method in which ceramic beads having a diameter of about 1 mm are added to a cellulose dispersion having a cellulose concentration of 0.1-10% by weight, e.g., about 1% by weight, and the resultant mixture is oscillated with a paint shaker, bead mill, or the like to fibrillate the cellulose.

Examples thereof further include: a method in which such a cellulose dispersion is passed through a blender type disperser or through the slit which is rotating at a high speed, and shear force is thereby applied to the cellulose and fibrillate the cellulose (high-speed homogenizer); a method in which a high pressure is abruptly dropped to thereby apply shear force to the cellulose fibers and fibrillate the cellulose (high-pressure homogenizer method); and a method in which a disperser of the countercurrent type such as Masscomizer X (manufactured by Masuko Sangyo Co., Ltd.) or the like is used. In particular, the treatment with a high-speed homogenizer or a high-pressure homogenizer attains an improvement in the efficiency of fibrillation.

In the case where these treatments are used for fibrillation, the solid concentration (cellulose concentration) in the cellulose dispersion to be subjected to the treatments is 0.2-10% by weight, in particular, 0.3-6% by weight. In case where the solid concentration in the cellulose dispersion to be subjected to this fibrillation step is too low, the amount of the liquid relative to the amount of the cellulose to be treated is too large, resulting in a poor efficiency. In case where the solid concentration therein is too high, this dispersion shows impaired flowability. Consequently, the concentration of the cellulose dispersion to be subjected to the fibrillation treatment is regulated, for example, by suitably adding water thereto.

In the case of the high-speed homogenizer, higher rotation speeds enhance shear force and bring about a high fibrillation efficiency. The rotation speed thereof is, for example, preferably 10,000 rpm or higher, more preferably 15,000 rpm or higher, especially preferably 20,000 rpm or higher. The period is preferably 1 minute or longer, more preferably 5 minutes or longer, especially preferably 10 minutes or longer. In the case where the shearing generates heat, it is preferred to cool the dispersion to such a degree that the liquid temperature does not exceed 50° C. It is also preferred to stir or circulate the dispersion so that shear force is evenly applied to the dispersion. Besides the method in which fibrillation is conducted by means of high-speed rotation, the high-pressure homogenizer method may be used to eject the liquid from a high-pressure atmosphere of 100 MPa or higher.

In the case of using a high-pressure homogenizer, the cellulose dispersion is pressurized to 30 MPa or higher, preferably 100 MPa or higher, more preferably 150 MPa or higher, even more preferably 220 MPa or higher, with a pressure intensifier and ejected through a nozzle having a pore diameter of 50 µm or more to decompress the dispersion so as to result in a pressure difference of 30 MPa or more, preferably 80 MPa or more, more preferably 90 MPa or more. The cellulose fibers are fibrillated by means of the cleavage phenomenon resulting from the pressure difference. In case where the pressure included in the high-pressure conditions is low or the pressure difference between the high pressure and the decompression conditions is small, the result is a decrease in fibrillation efficiency to necessitate a larger number of repetitions of the ejection for obtaining a desired fiber diameter. Such cases are hence undesirable. Also in case where the pore through which the cellulose dispersion is ejected has too large a diameter, a sufficient fibrillation effect is not obtained. In this case, there is a possibility that even when the ejection is repeatedly conducted, cellulose fibers having a desired fiber diameter might not be obtained.

The ejection of the cellulose dispersion is repeated multiple times according to need. The degree of size reduction is thereby heightened, and cellulose fibers having a desired fiber diameter can be obtained. The number of repetitions of this operation (number of passes) is generally 1 or more, preferably 3 or more, and is generally 20 or less, preferably 15 or less. The larger the number of passes, the more the degree of size reduction can be heightened. However, an excessively large number of passes is undesirable because an increased cost results.

The high-pressure homogenizer is not particularly limited. Examples of usable apparatus include the apparatus manufactured by Gaulin or "Star Burst System" manufactured by Sugino Machine Ltd.

With respect to the high-pressure conditions for ejection, higher pressures are effective in attaining further size reduction by means of an enhanced cleavage phenomenon due to a pressure difference. However, the upper limit in the apparatus specifications is generally 245 MPa or less.

Likewise, although it is preferred that the pressure difference between the high-pressure conditions and the decompression conditions should be large, the upper limit of pressure difference is usually 245 MPa or less because the cellulose dispersion is generally ejected from the high-pressure conditions obtained with a pressure intensifier into atmospheric-pressure conditions.

When the pore through which the cellulose dispersion is ejected has a small diameter, a high-pressure state can be easily attained. However, too small pore diameters result in an impaired ejection efficiency. The diameter of the pore is 50-800 preferably 100-500 μm, more preferably 150-300 μm.

There are no particular limitations on the temperature during ejection (temperature of the dispersion). However, the temperature of the dispersion is usually 5-100° C. Too high temperatures are undesirable because there is a possibility that deterioration of the apparatus, specifically, the liquid feed pump, high-pressure sealing parts, etc., might be accelerated.

One ejection nozzle only may be used, or two ejection nozzles may be used. The cellulose ejected may be struck against a wall, ball, or ring disposed in the ejection area. In the case of using two nozzles, the cellulose jets may be struck together in the ejection area.

Although the dispersion of cellulose microfibers of the invention can be obtained through a treatment with such a high-pressure homogenizer alone, this case requires a larger number of repetitions for attaining a sufficient degree of size reduction, resulting in an impaired treatment efficiency. It is therefore preferred that after the treatment with a high-pressure homogenizer is conducted about 1-5 times, the ultrasonic treatment which will be described later should be performed to reduce the size.

It is preferred in the invention that the cellulose dispersion to be subjected to an ultrasonic treatment should have a cellulose concentration of 0.01-10% by weight, especially 0.1-5% by weight, in particular 0.2-2% by weight. In case where the cellulose concentration of the cellulose dispersion to which an ultrasonic wave is to be propagated is too low, the treatment is inefficient. In case where the cellulose concentration thereof is too high, this dispersion has a high viscosity, resulting in uneven fibrillation. Consequently, in the invention, water and/or an organic solvent is added according to need so that the cellulose concentration of the cellulose dispersion to be subjected to the ultrasonic treatment becomes the given concentration.

As an organic solvent serving as the dispersion medium of the cellulose dispersion, use can be made of one or more members selected from alcohols such as methanol, ethanol, isopropyl alcohol, n-propyl alcohol, and n-butanol, ketones such as acetone and methyl ethyl ketone, and other water-soluble organic solvents. Furthermore, water-insoluble organic solvents can also be used therewith. However, it is preferred that the dispersion medium should be a liquid mixture of an organic solvent and water or be water. Especially preferably, the dispersion medium is water.

It is preferred that the cellulose fibers in the cellulose dispersion to which an ultrasonic wave is to be propagated should be regulated beforehand so as to have a number-average fiber diameter of 10 μm or less, especially 2 μm or less, by the fibrillation described above. It is more preferred that the number-average fiber diameter thereof should be 1 μm or less.

The ultrasonic wave to be propagated to the cellulose dispersion has a frequency of 15 kHz to 1 MHz, preferably 20-500 kHz, more preferably 20-100 kHz. In case where the frequency of the ultrasonic wave to be propagated is too low, cavitation, which will be described later, is less apt to occur. In case where the frequency thereof is too high, the partial vacuums formed by cavitation disappear without growing to such a degree that the vacuums exert a physical action. Too low or too high frequencies thereof hence do not produce the effect of size reduction. The output of the ultrasonic wave is 1 W/cm$^2$ or more, preferably 10 W/cm$^2$ or more, more preferably 20 W/cm$^2$ or more, in terms of effective output density. In case where the ultrasonic wave output is too low, the efficiency of size reduction is low and it is necessary to conduct long-term propagation in order to attain sufficient size reduction. Such a treatment is impracticable. Incidentally, the upper limit of the effective output density of the ultrasonic wave is 500 W/cm$^2$ or less from the standpoint of the durability of the oscillator, horn, etc.

Incidentally, the effective output density of an ultrasonic wave can be calculated from an increase in the temperature of 500 mL of water. Specifically, 500 mL of water is introduced into a vessel, and an ultrasonic wave is propagated to the water. The resultant increase in temperature is measured, and the effective output density of the ultrasonic wave can be determined through calculation using the following equation.

$$P=(T/s) \times 4.18 \times 500/A$$

In the equation, P is the effective output density (W/cm$^2$) of the ultrasonic wave; T is the increase in temperature (° C.); s is time (seconds); and A is the area (cm$^2$) of the oscillating part for ultrasonic-wave generation. In the case of the horn type, A is the area of the end thereof. In the case of the bath tub type, A corresponds to the area of the surface to which the oscillator has been attached.

When the temperature measurement is made, it is necessary that the water vessel should be thermally insulated sufficiently in order that the heat generated by the applied ultrasonic-wave energy might not be transferred to the outside. Furthermore, at temperatures higher than room temperature, the heat is apt to be transferred to the outside. Consequently, the temperature to which the water has heated up and which is higher than room temperature by 10° C. and the period required for the temperature increase are used to calculate the output density using that equation.

There are no particular limitations on methods for propagating an ultrasonic wave, and various methods can be utilized. For example, use can be made of: a method in which the horn which transmits the oscillation of an ultrasonic oscillator is directly inserted into the cellulose dispersion to thereby directly reduce the size of the cellulose fibers; a method in which an ultrasonic oscillator is disposed on part of the bottom and wall of a container which contains the cellulose dispersion, thereby reducing the size of the cellulose fibers; and a method in which a liquid, e.g., water, is placed in a vessel to which an ultrasonic oscillator has been attached, and a vessel containing the cellulose dispersion is immersed therein to thereby indirectly apply ultrasonic oscillation to the cellulose dispersion through the liquid, e.g., water, and reduce the size of the cellulose fibers. Of these, the method in which the horn is directly inserted into the cellulose dispersion is highly efficient because ultrasonic energy can be directly transmitted and an increase in energy density can be attained. This method is hence suitable.

The cellulose dispersion may be subjected to the size reduction treatment by a batch treatment method in which an ultrasonic wave having a given frequency is propagated to a given amount of the cellulose dispersion for a given period at a given effective output density and the dispersion is thereafter wholly replaced. Alternatively, the cellulose dispersion may be treated by a method in which the cellulose dispersion is passed at a given rate through a treatment vessel in which an ultrasonic oscillator has been disposed in the vicinity of the horn or on the bottom or wall thereof, thereby continuously propagating an ultrasonic wave to the dispersion. A plurality of ultrasonic oscillators may be disposed in one treatment vessel, or a plurality of treatment vessels which each have one oscillator disposed therein may be connected to each other and used. Especially when the cellulose-containing-substance dispersion is to be continuously passed and treated, the method in which treatment vessels each having an oscillator are serially connected and the cellulose dispersion is passed therethrough successively is suitable from the standpoint of efficiency. In this case, the multiple oscillators may have the same frequency or may differ in frequency.

An ultrasonic wave may be continuously propagated or may be intermittently propagated at given intervals. For example, use may be made of a method in which ultrasonic wave propagation conducted for 0.1-0.9 seconds and a pause for 0.9-0.1 second are alternately repeated.

When an ultrasonic treatment is conducted, the applied energy is converted to heat and the temperature of the cellulose dispersion rises. Consequently, it is preferred to keep the temperature of the cellulose dispersion constant, for example, by cooling or heating the dispersion, in order to conduct the size reduction treatment under constant treatment conditions. The temperature during the ultrasonic treatment is preferably 1-80° C., more preferably 10-60° C., even more preferably 15-40° C. In case where the temperature is too low, the dispersion freezes to become unable to be treated, when water was used as the dispersion medium. Namely, when the dispersion medium is solid ice, it is difficult to cause cavitation. In case where water and ice coexist, cavitation occurs on the surface of the ice to consume energy, resulting in a decrease in the efficiency of cellulose size reduction. Conversely, too high treatment temperatures are undesirable because minute bubbles of a vapor, e.g., water vapor, generate on the surface of the ultrasonic oscillator, resulting in a decrease in energy efficiency.

The period of the treatment with ultrasonic wave propagation may be any period which is sufficient for the cellulose fibers in the dispersion to be reduced in size to a desired degree. The treatment period is suitably set according to the output and frequency of the ultrasonic wave used, the fiber diameter of the cellulose fibers to be treated with ultrasonic wave propagation, etc.

The principle on which cellulose fibers are reduced to microfibers by an ultrasonic treatment has not been fully elucidated. However, it is presumed that the following phenomenon occurs.

When an ultrasonic wave is propagated to a liquid, e.g., water, which contains cellulose fibers suspended or dispersed therein, the ultrasonic wave generated by the ultrasonic oscillator strikes on the cellulose fibers to cause cavitation at the interface between the cellulose fibers and the water. Although the cavities generated rapidly contract and disappear, the cavities generate large shear force therearound. As a result, fine cellulose fibers are separated from the surface of the cellulose fibers to thereby yield cellulose microfibers.

<Average Fiber Diameter>

The fiber diameter of the cellulose fibers in the cellulose dispersion which have been fibrillated by the method described above can be determined by drying the dispersion to remove the dispersion medium and then examining the cellulose fibers with an SEM, TEM, or the like.

The number-average fiber diameter of the fibrillated modified cellulose fibers obtained by the invention is characterized by being preferably 100 nm or less, from the standpoint of obtaining a highly transparent cellulose composite. The number-average fiber diameter thereof is more preferably 80 nm or less, especially preferably 50 nm or less. The lower limit of the average fiber diameter thereof is generally 4 nm or more.

<Cellulose I Type Crystals>

The cellulose fibers to be used in the invention have a cellulose I type crystal structure.

The cellulose I type crystal structure is as described in, for example, *Serurōsu No Jiten*, first issue in new binding, pp. 81-86 or pp. 93-99, published by Asakura Publishing Co., Ltd. Most native celluloses have a cellulose I type crystal structure. In contrast, cellulose fibers which have not a cellulose I type crystal structure but, for example, a cellulose II, III, or IV type crystal structure are derived from cellulose having a cellulose I type crystal structure. Cellulose I type crystals have a higher modulus of elasticity than the other crystal structures and, hence, cellulose fibers having a cellulose I type crystal structure have a high modulus of elasticity, high strength, and a low coefficient of linear expansion and are preferred.

That a cellulose fiber has a I-type crystal structure can be ascertained from a diffraction profile (wide-angle X-ray diffraction image) thereof obtained through wide-angle X-ray diffractometry, the diffraction profile having characteristic peaks at two positions, i.e., at a scanning angle $2\theta$ of around 14-17° and at a $2\theta$ of around 22-23°.

On the other hand, in case where the cellulose I type crystal structure is damaged, a halo assigned to amorphous regions comes to be observed at around a $2\theta$ of 18-19°. Also in the case of cellulose fibers having a crystal structure which is not the I-type, a peak is observed at around that angle.

The cellulose contained in the dispersion of modified cellulose fibers of the invention satisfies that the ratio of the "average diffraction intensity in the scanning angle range of 18-19 degrees" (which reflects any structure(s), e.g., amorphous structure, other than I-type) to the "intensity of the diffraction peak assigned to a cellulose I type crystal structure in the scanning angle range of 20-24 degrees" is 0.8 or less. The ratio is preferably 0.7 or less, especially 0.6 or less, in particular 0.5 or less. The lower the intensity ratio, the better. Practically, however, the intensity ratio is about 0.01 or more.

II. Dispersion of Modified Cellulose Fibers of the Invention

The dispersion of modified cellulose fibers of the invention is a dispersion of cellulose fibers having a cellulose I type crystal structure in which 10% by mole or more of all hydroxyl groups of the cellulose have been modified with aromatic-ring-containing substituents, and is characterized in that the cellulose fibers give a wide-angle X-ray diffraction image in which the ratio of the "average diffraction intensity in the scanning angle range of 18-19 degrees" to the "intensity of a diffraction peak assigned to a cellulose I type crystal structure in the scanning angle range of 20-24 degrees" is 0.8 or less. The ratio is preferably 0.7 or less, especially 0.6 or less, in particular 0.5 or less. The lower the intensity ratio, the better. Practically, however, the intensity ratio is about 0.01 or more.

The dispersion of modified cellulose fibers of the invention may be obtained by swelling cellulose while maintaining the cellulose I type crystal structure thereof, reacting the cellulose in the swollen state with a chemical modifier, and subjecting the modified cellulose to a fibrillation step according to need. Methods for swelling the cellulose are not particularly limited, and a solvent having the effect of swelling fibers can be selected as the solvent for use in the chemical modification reaction. Examples of the solvent include alcohols such as methanol and ethanol, diols such as ethylene glycol, aprotic polar solvents such as dimethylformamide, and heterocyclic compounds such as pyridine. Preferred of such methods is the production process described above in I., in which an organic acid is used as a solvent during the chemical modification reaction. With respect to the fibrillation step also, the methods described in I. can be used.

The cellulose contained in the dispersion of modified cellulose fibers of the invention is characterized by having a degree of chemical modification of 10% by mole or higher based on all hydroxyl groups of the cellulose. The degree of chemical modification thereof is preferably 11% by mole or higher, especially preferably 15% by mole or higher, and is generally 60% by mole or less, preferably 55% by mole or less, more preferably 50% by mole or less, even more preferably 45% by mole or less, especially preferably 40% by mole or less. For determining the degree of modification, the same method as in the production process described above in I. is used.

The chemical modification elevates the heat decomposition temperature of the cellulose fibers, enhances the heat resistance thereof, and reduces the thermal discoloration thereof. The chemical modification hence is preferred. In particular, the modification reaction according to the invention enables the cellulose to satisfactorily retain the I-type crystal structure and thus show excellent heat resistance.

This is thought to be because the modification reaction according to the invention renders more even modification possible by swelling the fibers during the reaction without damaging the I-type crystal structure and then modifying the fibers in this state.

In case where the degree of this chemical modification is too low, enhanced discoloration occurs when the modified cellulose fibers are heated in a post-treatment during composite formation. In case where the degree of chemical modification is too high, the crystal structure of the cellulose fibers is destroyed to reduce the crystallinity thereof, resulting in a problem that the composite material to be obtained has an increased coefficient of linear expansion. Too low or too high degrees of chemical modification hence are undesirable. In addition, too low degrees of chemical modification are undesirable because the results are enhanced hydrophilicity, a prolonged filtration period for dehydration, and an increased moisture content of the cellulose fibers obtained. Especially when a ligneous material was used as a raw material for cellulose, low values of the degree of chemical modification are undesirable because the modified cellulose fibers discolor when heated in a post-treatment during composite formation. Furthermore, investigations made by the inventors revealed that modified cellulose which has been obtained through modification with aromatic-ring-containing substituents and which has a degree of chemical modification within that range is easy to fibrillate and gives a cellulose composite having enhanced transparency. Although reasons therefor have not been elucidated in detail, it is thought that the cellulose chains have become easy to separate from one another probably because of steric hindrance of the substituents.

<Heat Decomposition Temperature>

The cellulose contained in the dispersion of modified cellulose fibers of the invention has a heat decomposition temperature of preferably 300° C. or higher, more preferably 335° C. or higher. Although there is no particular upper limit, the heat decomposition temperature thereof is generally 400° C. or lower. Too low heat decomposition temperatures pose a problem that discoloration due to heat decomposition is enhanced. The cellulose contained in the dispersion of modified cellulose fibers of the invention has satisfactory heat resistance because the cellulose has a high heat decomposition temperature as described above. The reason for this is presumed to be that modification at the 6-position hydroxyl group inhibits the main chain from splitting.

<Average Fiber Diameter>

The fiber diameter of the cellulose fibers in the dispersion of modified cellulose fibers of the invention which has undergone fibrillation in accordance with the process I. described above can be determined by drying the dispersion to remove the dispersion medium and then examining the cellulose fibers with an SEM, TEM, or the like.

The number-average fiber diameter of the cellulose fibers contained in the dispersion of fibrillated modified cellulose fibers obtained according to the invention is characterized by being preferably 100 nm or less, from the standpoint of obtaining a highly transparent cellulose composite. The number-average fiber diameter thereof is more preferably 80 nm or less, especially preferably 50 nm or less. The lower limit of the average fiber diameter thereof is generally 4 nm or more.

The dispersion of modified cellulose fibers of the invention, which has been produced through the modification step and fibrillation step described above, can be suitably subjected to regulation of the dispersion medium (solvent) concentration, replacement of the dispersion medium, addition of various additives, etc., according to applications thereof.

The fibrillation liquid which has undergone the fibrillation step basically contains water as the dispersion medium. Consequently, when water is used as a dispersion medium (solvent), this liquid can be used as such or diluted with water. It is also possible to add not water but an organic solvent and to concentrate the resultant mixture to a desired composition. In the case of using a solvent other than water, solvent replacement is necessary. In this case, it is preferred that after a solvent has been added, the water should be removed by concentration. When a solvent is added, it is preferred that the solvent should be gradually added while the fibrillation liquid is, for example, being stirred in order to avoid coagulation. In the case of conducting concentration, it is necessary to take care not to allow the system to become uneven. This is because there are cases where cellulose coagulation occurs when the system has become uneven, and because this heightens the haze of the cellulose fiber composite. When solvent replacement is to be conducted, methods other than the method described above are possible. It is, however, important that the replacement should be conducted while preventing the cellulose from drying.

It is preferred that the solvent to be used as the dispersion medium should be water and/or a water-soluble organic solvent. In many cases, the fibrillation liquid which has undergone the fibrillation step basically contains water and/or a water-soluble organic solvent as the dispersion medium. Consequently, replacement with a water-insoluble organic solvent is undesirable because the solvent for replacement is necessary in a large amount and much time is required therefor.

The term water-soluble organic solvent herein means an organic solvent which, when gently stirred together with the same volume of pure water at 1 atm and 20° C., gives a liquid mixture that retains a homogeneous appearance even after the mixture becomes still. Examples thereof include monohydric alcohols such as methanol, ethanol, n-propyl alcohol, isopropyl alcohol, t-butyl alcohol, and allyl alcohol, polyhydric alcohols (glycols) such as ethylene glycol, butyl glycol, t-butyl glycol, methyl diglycol, ethyl diglycol, butyl diglycol, methyldipropylene glycol, and glycerol, alkyl ethers of such glycols, such as 1-methoxy-2-propanol, 2-ethoxyethanol, 2-n-butoxyethanol, 3-methoxybutanol, 3-methyl-3-methoxybutanol, ethylene glycol monomethyl ether, ethylene glycol dimethyl ether, ethylene glycol monophenyl ether, propylene glycol monomethyl ether, propylene glycol dimethyl ether, diethylene glycol monomethyl ether, diethylene glycol dimethyl ether, diethylene glycol ethyl methyl ether, diethylene glycol monoethyl ether, diethylene glycol diethyl ether, diethylene glycol monobutyl ether, diethylene glycol butyl methyl ether, diethylene glycol dibutyl ether, dipropylene glycol monomethyl ether, dipropylene glycol dimethyl ether, triethylene glycol monomethyl ether, triethylene glycol dimethyl ether, triethylene glycol butyl methyl ether, tripropylene glycol dimethyl ether, tetraethylene glycol dimethyl ether, polyethylene glycol monomethyl ether, and polyethylene glycol dimethyl ether, esters such as diethylene glycol monobutyl ether acetate, ethylene glycol monomethyl ether acetate, and ethyl lactate, ethers such as tetrahydrofuran and 1,4-dioxane, ketones such as acetone and diacetone alcohol, nitrogen compounds such as acetonitrile, pyridine, N,N-dimethylformamide, N,N-dimethylacetamide, and N-methyl-2-pyrrolidone, acetic acid, acrylic acid, methacrylic acid, and butyric acid. Two or more of these solvents may be used in combination.

[Process for Producing Sheet of Modified Cellulose Fibers]

The modified cellulose fibers of the invention can be molded into a sheet form. A sheet of modified cellulose fibers is thereby obtained. This cellulose sheet can be impregnated with a resin to give a cellulose composite, or can be sandwiched between resin sheets to give a cellulose composite. The sheet of modified cellulose fibers (hereinafter referred to also as "cellulose sheet") of the invention may be produced using the modified cellulose fibers as such. However, the cellulose sheet produced using the modified cellulose fibers which have undergone the fibrillation step gives cellulose composites having higher transparency, a lower coefficient of linear expansion, and a higher modulus of elasticity. Specifically, that cellulose sheet is a sheet produced by filtering the cellulose dispersion which has undergone the fibrillation step described above (hereinafter referred to also as "fibrillated-cellulose dispersion") or by applying the dispersion to an adequate substrate.

<Papermaking Step>

In the case where a cellulose sheet is produced by filtering the fibrillated-cellulose dispersion (hereinafter, this step is sometimes referred to as "papermaking"), it is preferred that the concentration of the fibrillated-cellulose dispersion to be filtered should be 0.01% by weight or higher, preferably 0.05% by weight or higher, more preferably 0.1% by weight or higher. Too low concentrations thereof are undesirable because the filtration requires much time. It is also preferred that the concentration of the fibrillated-cellulose dispersion should be 1.5% by weight or less, preferably 1.2% by weight or less, more preferably 1.0% by weight or less. Too high concentrations are undesirable because an even sheet is not obtained.

It is important to use for the filtration a filter cloth which prevents the cellulose microfibers from passing therethrough and which is capable of filtration at a rate that is not too low. Preferred as such a filter cloth is a sheet, woven fabric, or porous film made of an organic polymer. Preferred as the organic polymer is a non-cellulosic organic polymer such as poly(ethylene terephthalate), polyethylene, polypropylene, or polytetrafluoroethylene (PTFE).

Specifically, examples thereof include a porous film of polytetrafluoroethylene having a pore diameter of 0.1-20 µm, e.g., 1 µm, and woven fabric of poly(ethylene terephthalate) or polyethylene which has a pore diameter of 0.1-20 µm, e.g., 1 µm.

The cellulose sheet can have any of various porosities according to processes for production thereof. Examples of methods for obtaining a cellulose sheet having a high porosity include a method in which in the step of film formation by filtration, the water contained in the cellulose sheet is replaced with an organic solvent, e.g., an alcohol, in the final stage. In this method, water is removed by filtration and, at the time when the cellulose content has reached 5-99% by weight, an organic solvent such as an alcohol is added. Alternatively, replacement with an organic solvent, e.g., an alcohol, in the final stage of filtration can be accomplished also by charging the fibrillated-cellulose dispersion into a filtration apparatus and thereafter gently charging an organic solvent, e.g., an alcohol, so that the organic solvent is disposed over the dispersion.

The organic solvent, e.g., an alcohol, to be used here is not particularly limited. Examples thereof include one or more organic solvents selected from alcohols such as methanol, ethanol, 1-propanol, 2-propanol, and 1-butanol and from other solvents including acetone, methyl ethyl ketone, tetrahydrofuran, cyclohexane, toluene, and carbon tetrachloride. In the case where a water-insoluble organic solvent is to be used, it is preferred that the water-insoluble organic solvent should be used as a solvent mixture with a water-soluble organic solvent or that replacement with the water-insoluble organic solvent should be conducted after replacement with a water-soluble organic solvent.

In the case where a cellulose sheet having a high porosity is obtained by such a method, there are no particular limitations on filtration period. However, in the case where the fibrillated-cellulose dispersion is filtered by batch filtration in an amount of 40 g/m$^2$, the filtration period is generally 120 minutes or shorter, preferably 110 minutes or shorter, more preferably 100 minutes or shorter, and is generally 0.1 minute or longer, preferably 0.3 minutes or longer, more preferably 0.5 minutes or longer. Too long filtration periods pose problems that the production efficiency decreases and that a huge filtration apparatus is required when continuous filtration is conducted.

Use of the modified cellulose fibers according to the invention enables the filtration to be conducted at a higher rate as compared with unmodified cellulose and cellulose modified with aliphatic substituents. In addition, a highly transparent cellulose composite can be obtained from the resultant sheet.

Thereafter, drying is conducted. This drying may be drying with air blowing, or may be vacuum drying, or may be drying with pressing. Furthermore, the sheet may be dried with heating. In the case where heating is conducted, the temperature is preferably 50° C. or higher, more preferably 80° C. or higher, and is preferably 250° C. or lower, more preferably 150° C. or lower. When the heating temperature is too low, there is a possibility that the drying might require much time or the sheet might be dried insufficiently. When the heating temperature is too high, there is a possibility that the cellulose sheet might discolor or the cellulose might be degraded. In the case where the sheet is pressed, the pressure is preferably 0.01 MPa or higher, more preferably 0.1 MPa or higher, and is preferably 5 MPa or less, more preferably 1 MPa or less. Too low pressures may result in a possibility that drying might be insufficient. Too high pressures may result in a possibility that the planar structure of cellulose fibers might be flattened or the cellulose might be degraded.

In a method for obtaining a cellulose sheet having a low porosity, the fibrillated-cellulose dispersion is filtered or applied and is then dried. Namely, examples of methods for obtaining a dense cellulose sheet having a low porosity include a method in which the step of film formation by filtering the fibrillated-cellulose dispersion is conducted and the resultant sheet is subjected as such to a drying step, without conducting the replacement with an organic solvent, e.g., an alcohol, in the final stage of the film formation step as described above. The filtration period, in the case of obtaining a cellulose sheet having a low porosity by such a method, is not particularly limited. However, in the case where the fibrillated-cellulose dispersion is filtered by batch filtration in an amount of 40 g/m$^2$, the filtration period is generally 80 minutes or shorter, preferably 70 minutes or shorter, more preferably 60 minutes or shorter, and is generally 0.1 minute or longer, preferably 0.3 minutes or longer, more preferably 0.5 minutes or longer. Too long filtration periods pose problems that the production efficiency decreases and that a huge filtration apparatus is required when continuous filtration is conducted. The drying may be conducted in the manner described above.

<Average Fiber Diameter>

The fiber diameter of the cellulose fibers contained in the sheet of modified cellulose fibers obtained according to the invention can be determined through an examination with an SEM, TEM, etc.

The number-average fiber diameter of the cellulose fibers contained in the sheet of modified cellulose fibers obtained according to the invention is characterized by being preferably 100 nm or less, from the standpoint of obtaining a highly transparent cellulose composite. The number-average fiber diameter thereof is more preferably 80 nm or less, especially preferably 50 nm or less. The lower limit of the average fiber diameter thereof is generally 4 nm or more.

Chemical modification can be conducted after the modified cellulose fibers have been formed into a cellulose sheet. In this case, the sheet obtained in the manner described above may be subjected to the chemical modification after having been dried or before being dried. This cellulose sheet is reacted with a chemical modifier in the manner described above, subsequently washed with water and/or an organic solvent, and then dried to thereby obtain a modified-cellulose sheet.

There are no particular limitations on the thickness of the cellulose sheet. However, the thickness thereof is preferably 1 μm or more, more preferably 5 μm or more, and is generally 1,000 μm or less, preferably 250 μm or less. A preferred cellulose sheet obtained according to the invention, when examined after having been converted to the composite material shown under (1) below, has a haze measured with illuminant C of 3 or less, desirably 2 or less, especially 1 or less.

(1) A composite material obtained by: immersing the cellulose fiber sheet having a thickness regulated so that the sheet has a basis weight of 40 g/m$^2$, in a solution prepared by mixing 96 parts by weight of bis(methacryloyloxymethyl)tricyclo[5.2.1.0$^{2,6}$]decane with 6 parts by weight of pentaerythritol tetrakis(β-thiopropionate), 0.05 parts by weight of 2,4,6-trimethylbenzoyldiphenylphosphine oxide, and 0.05 parts by weight of benzophenone; holding the sheet under vacuum overnight; subsequently sandwiching the sheet between two glass plates; curing the curable compounds using an electrodeless mercury lamp; thereafter separating the sheet from the glass plates; and then heating the sheet in a 190° C. vacuum oven for 4 hours.

<Discoloration>

The sheet of modified cellulose fibers obtained according to the invention suffers little discoloration even through a heating step. Even after having been heat-treated at 190° C. for 4 hours under vacuum, on the supposition of heating during composite formation with a matrix, the sheet of modified cellulose fibers has a YI value of preferably 40 or less, more preferably 35 or less, especially preferably 25 or less. Values of YI can be measured, for example, with a color computer manufactured by Suga Test Instruments Co., Ltd.

<Tensile Strength>

The sheet of modified cellulose fibers obtained according to the invention suffers little decrease in tensile strength even through a heating step. The ratio of the tensile strength of the sheet which has undergone a 4-hour heat treatment at 190° C. under vacuum to the tensile strength thereof before the treatment is 90% or higher, preferably 95% or higher, especially preferably 99% or higher.

<Tensile Modulus>

The sheet of modified cellulose fibers obtained according to the invention shows a high tensile modulus. The tensile modulus of the sheet which has undergone a 4-hour heat treatment at 190° C. under vacuum is preferably 0.2-100 GPa, more preferably 1.0-50 GPa, even more preferably 4.0-30 GPa.

[Processes for Producing Cellulose Particles]

The modified cellulose fibers of the invention can be converted to cellulose particles. These cellulose particles are especially suitable for use in composite formation through kneading together with a thermoplastic resin. The resultant composite is useful as various structural materials, in particular, automotive panels having a highly attractive surface appearance, external walls of buildings, and the like, owing to the properties thereof such as a high modulus of elasticity, a low coefficient of linear expansion, and surface smoothness.

Examples of methods for converting the cellulose fibers obtained according to the invention into particles include a method in which the cellulose fibers obtained according to the invention are converted to a dispersion and this dispersion is ejected through a spray nozzle or the like using, for example, a known spray dryer to thereby remove the dispersion medium and form particles. Examples of methods for the ejection include a method using a rotating disk, a method using a pressure nozzle, and a method using a two-fluid nozzle. The particles obtained by spray drying may be further dried using another drying apparatus. As a heat energy source in this case, use may be made of infrared rays or microwaves.

Cellulose particles can be obtained also by freeze-drying the cellulose fibers obtained according to the invention and then pulverizing the dried fibers. In this case, examples of methods include a method in which the cellulose fibers obtained by the production process of the invention are cooled with liquid nitrogen or the like and then pulverized with a grinder, rotating blade, or the like.

Furthermore, a composite of the cellulose fibers obtained according to the invention can be obtained also in the following manners. The cellulose fibers in an aqueous-dispersion state are combined with a polymer other than cellulose in the water, without being dried, and the water is removed thereafter to thereby obtain a composite. Alternatively, the water in the aqueous dispersion of the cellulose fibers is replaced with an organic solvent, and the cellulose fibers are thereafter combined with a polymer other than cellulose in the organic solvent, which is then removed to thereby obtain a composite.

III. Cellulose Fiber Composites of the Invention

The cellulose fibers, cellulose sheet, or cellulose particles obtained by the process of the invention for producing a dispersion of modified cellulose fibers are combined with a polymer as a matrix to thereby obtain a cellulose fiber composite. The cellulose fiber composite is useful as various display substrate materials, substrates for solar cells, and window materials owing to the properties thereof such as high transparency, a low coefficient of linear expansion, and colorlessness. Furthermore, the cellulose fiber composite is useful as various structural materials, in particular, automotive panels having a highly attractive surface appearance, external walls of buildings, and the like, owing to the properties thereof such as a high modulus of elasticity, a low coefficient of linear expansion, and surface smoothness.

Processes for producing a cellulose fiber composite by combining cellulose with a polymer are explained below.

The cellulose fiber composites of the invention are composites obtained by combining the dispersion of modified cellulose fibers, sheet of modified cellulose fibers, or cellulose particles obtained by the invention described above with a polymer other than cellulose, and preferably are composites obtained by combining the cellulose sheet or cellulose particles of the invention with a matrix material which is a polymer other than cellulose or a precursor therefor.

The term matrix material herein means a polymeric material or precursor therefor (e.g., a monomer) which is laminated to a cellulose sheet, fills interstices, or is used for kneading cellulose particles therewith.

Suitable for use as this matrix material is at least one resin (polymeric material) or precursor therefor which is selected from a thermoplastic resin that becomes flowable liquid upon heating, a thermosetting resin that polymerizes upon heating, or an active energy ray curable resin which is polymerized and cured when irradiated with active energy rays, such as ultraviolet rays or electron beams, and the like.

The term "precursor for a polymer material" in the invention means a so-called monomer or oligomer. Examples thereof include the monomers which will be shown later as (co)polymerizable components in the section "Thermoplastic Resins" (hereinafter sometimes referred to as thermoplastic resin precursors) and the precursors which will be shown later in the sections "Thermosetting Resins" and "Photocurable Resins".

Examples of methods for obtaining the cellulose fiber composites of the invention include the following methods (a) to (j).

(a) A method in which a liquid thermoplastic resin precursor is impregnated into the cellulose sheet or particles or the like and polymerized.

(b) A method in which a precursor for a thermosetting resin or a precursor for an active energy ray curable resin is impregnated into the cellulose sheet or particles or the like and is polymerized/cured.

(c) A method which includes impregnating a resin solution (a solution containing one or more solutes selected from thermoplastic resins, thermoplastic resin precursors, thermosetting resin precursors, and photocurable resin precursors) into the cellulose sheet or particles or the like, drying the solution, thereafter adhering the cellulose and the matrix material together by, for example, hot pressing, and conducting polymerization/curing according to need.

(d) A method in which a melt of a thermoplastic resin is impregnated into the cellulose sheet or particles or the like and adhering the cellulose and the matrix material together by, for example, hot pressing.

(e) A method in which a thermoplastic resin sheet (or film) and the cellulose sheet are alternately disposed and all these sheets are adhered together by, for example, hot pressing.

(f) A method in which a liquid thermoplastic resin precursor, a thermosetting resin precursor, or a precursor for an active energy ray curable resin is applied to one or both surfaces of the cellulose sheet and is polymerized/cured.

(g) A method which includes applying a resin solution (a solution containing one or more solutes selected from thermoplastic resins, thermoplastic resin precursors, thermosetting resin precursors, and photocurable type resin precursors) to one or both surfaces of the cellulose sheet, removing the solvent, and then conducting polymerization/curing according to need to thereby obtain a composite.

(h) A method in which the cellulose particles and a thermoplastic resin are melt-kneaded and the resultant mixture is molded into a sheet form or a desired shape.

(i) A method which includes mixing the cellulose fiber dispersion with a monomer solution or dispersion (a solution or dispersion which contains one or more solutes or dispersoids selected from thermoplastic resin precursors, thermosetting resin precursors, and photocurable resin precursors), thereafter removing the solvent, and then polymerizing/curing the matrix material to obtain a composite.

(j) A method in which the cellulose fiber dispersion is mixed with a polymer solution or dispersion (a solution or dispersion of a thermoplastic resin) and the solvent is thereafter removed to obtain a composite.

For the cellulose sheet, methods (a), (b), (c), (d), (e), (f), and (g) are preferred of those methods. For the cellulose particles, method (h) is preferred.

Examples of the method (a), in which a liquid thermoplastic resin precursor is impregnated and polymerized, include a method in which a polymerizable monomer or oligomer is impregnated into the cellulose sheet or particles or the like and the monomer is polymerized by, for example, a heat treatment to thereby obtain a cellulose fiber composite. In general, a polymerization catalyst for use in monomer polymerization can be used as a polymerization initiator.

Examples of the method (b), in which a precursor for a thermosetting resin or a precursor for an active energy ray curable resin is infiltrated and polymerized/cured, include a method in which a mixture of a thermosetting resin precursor, e.g., an epoxy resin monomer, or photocurable resin precursor, e.g., acrylic resin monomer, and a hardener is infiltrated into the cellulose sheet or particles and the thermosetting resin precursor or photocurable resin precursor is cured by means of, for example, heat or actinic energy rays to thereby obtain a cellulose fiber composite.

Examples of the method (c), which includes infiltrating a resin solution (a solution containing one or more solutes selected from thermoplastic resins, thermoplastic-resin precursors, thermosetting resin precursors, and photocurable resin precursors), drying the solution, thereafter adhering the cellulose and the matrix material together by, for example, hot pressing, and conducting polymerization/curing according to need, include a method in which a resin is dissolved in a solvent in which the resin is soluble and the resultant solution is infiltrated into the cellulose sheet or particles or the like and dried to thereby obtain a cellulose fiber composite. In this case, examples thereof include a method in which after the drying, the interstices formed by solvent removal are tightly closed by, for example, hot pressing to thereby obtain a cellulose composite having higher performance. In the case of a photocurable resin, polymerization/curing with actinic energy rays or the like is further conducted according to need.

The solvent in which a resin is to be dissolved may be selected while taking account of affinity for the cellulose fibers and solubility of the resin. Specifically, the solvent may be selected, for example, from the solvents enumerated above as examples of the dispersion medium of the dispersion of modified cellulose fibers, according to the solubility of the resin.

Examples of the method (d), in which a melt of a thermoplastic resin is infiltrated and the cellulose and the matrix material are adhered together by, for example, hot pressing, include a method in which a thermoplastic resin is heat-treated at a temperature not lower than the glass transition temperature or melting point thereof to thereby melt the resin and this melt is infiltrated into the cellulose sheet or particles or the like and adhered thereto by, for example, hot pressing to thereby obtain a polymer/cellulose composite. It is desirable that the heat treatment should be conducted under pressure, and use of equipment having the function of vacuum hot pressing is effective.

Examples of the method (e), in which a thermoplastic-resin sheet (or film) and the cellulose sheet are alternately disposed and all these sheets are adhered together by, for example, hot pressing, include a method in which a film or sheet of a thermoplastic resin is dispersed on one or each surface of the cellulose sheet and this stack is heated and pressed according to need to thereby laminate the thermoplastic resin to the cellulose sheet. In this case, an adhesive, a primer, or the like may be applied to the surface of the cellulose sheet prior to the laminating. A method in which the stack is passed through the nip between two pressurized rolls or a method in which the stack is pressed under vacuum can be used in order to prevent air bubbles from being trapped during the laminating.

Examples of the method (f), in which a liquid thermoplastic-resin precursor, a thermosetting resin precursor, or a precursor for an active energy ray curable resin is applied to one or both surfaces of the cellulose sheet and is cured, include: a method in which a thermosetting resin precursor containing a heat polymerization initiator is applied to one or both surfaces of the cellulose sheet and heated to thereby cure the precursor and adhere the sheet and the resin to each other; and a method in which a curing type resin precursor containing a photopolymerization initiator is applied to one or both surfaces of the cellulose sheet and then irradiated with actinic energy rays, e.g., ultraviolet rays, to cure the precursor. Use may be made of a method in which after a precursor for a heat or photocurable resin has been applied to the cellulose sheet, a multilayer structure is formed, for example, by superposing another cellulose sheet thereon, before the precursor is cured.

Examples of the method (g), which includes applying a resin solution (a solution containing one or more solutes selected from thermoplastic resins, thermoplastic-resin precursors, thermosetting resin precursors, and photocurable resin precursors) to one or both surfaces of the cellulose sheet and removing the solvent to thereby obtain a composite, include a method in which a resin solution is prepared by dissolving a resin in a solvent in which the resin is soluble and this resin solution is applied to one or both surfaces of the cellulose sheet and heated to thereby remove the solvent. In the case of a photocurable resin, polymerization/curing with actinic energy rays or the like is further conducted according to need.

The solvent in which a resin is to be dissolved may be selected while taking account of affinity for the cellulose fibers and solubility of the resin. Specifically, the solvent may be selected, for example, from the solvents enumerated above as examples of the dispersion medium of the dispersion of modified cellulose fibers, according to the solubility of the resin.

A plurality of such cellulose composites, which each are a cellulose sheet/resin composite produced in the manner described above, can be superposed to obtain a laminate. In this case, the cellulose composites including a cellulose sheet may be laminated together with resin sheets including no cellulose sheet. An adhesive may be applied or an adhesive sheet may be interposed, in order to adhere the cellulose composites to each other or to adhere the resin to the cellulose composites. It is also possible to hot-press the laminate to unite the sheets.

Preferred examples of the method (h), in which the cellulose particles and a thermoplastic resin are melt-kneaded and the resultant mixture is molded into a sheet form or a desired shape, include a method in which the cellulose particles and a thermoplastic resin are dry-blended and then melted and a method in which the ingredients are melt-kneaded. The method in which the two ingredients are dry-blended and then melted includes evenly mixing the two ingredients with a tumbling blender, ribbon blender, twin-cylinder mixer, Henschel mixer, or the like, thereafter adding optional additives, e.g., an antioxidant, thereto, bringing the mixture into a molten state, and then forming a cellulose composite therefrom. Specifically, the mixture, for example, is merely melted or is melt-kneaded by means of a single- or twin-screw extruder, roll mill, Banbury mixer, kneader, Brabender, or the like. In the case where the two ingredients are melt-kneaded, the two ingredients are melt-mixed together with optional additives, e.g., an antioxidant, etc. For example, the ingredients are melt-kneaded by means of a single- or twin-screw extruder, roll mill, Banbury mixer, kneader, Brabender, or the like. Thereafter, the mixture is molded into a desired shape by extruding the mixture through a T-die into a sheet form or injecting the mixture into a mold.

The method (i), which includes mixing the cellulose fiber dispersion with a monomer solution or dispersion (a solution or dispersion which contains one or more solutes or dispersoids selected from thermoplastic-resin precursors, thermosetting resin precursors, and photocurable resin precursors), thereafter removing the solvent, and then polymerizing/curing the matrix material to obtain a composite, may be as follows. A solution obtained by dissolving a soluble monomer in a solvent or a dispersion of a monomer is prepared and mixed with the cellulose fiber dispersion. In this method, it is preferred that the water serving as the dispersion medium (solvent) solvent of the cellulose fiber dispersion should be replaced with an organic solvent according to need. By polymerizing the monomer in the resultant liquid mixture or by removing the solvent and then polymerizing/curing the monomer, a composite material can be obtained.

The method (j), in which the cellulose fiber dispersion is mixed with a polymer solution or dispersion (a solution or dispersion of a thermoplastic resin) and the solvent is thereafter removed to obtain a composite, may be as follows. A solution of a solvent-soluble polymer or a dispersion of a polymer is prepared and mixed with the cellulose fiber dispersion. In this method, it is preferred that the water serving as the dispersion medium (solvent) of the cellulose fiber dispersion should be replaced with an organic solvent according to need. By removing the solvent from the resultant liquid mixture, a composite material can be obtained.

[Matrix Materials]

Examples of the matrix material (polymeric material or precursor therefor) which is not cellulose and is to be combined with the cellulose sheet, cellulose particles, or cellulose fiber dispersion in the invention are shown below. However, matrix materials usable in the invention should not be construed as being limited to the following examples. Furthermore, the thermoplastic resins, the thermosetting resins, and the photocuring (actinic-energy-ray curing) type resins in the invention each can be used as a mixture of two or more thereof.

In the invention, especially preferred among the following matrix materials (polymeric materials or precursors therefor) are the polymeric materials which are amorphous synthetic polymers having a high glass transition temperature (Tg) or the precursors which give polymers that are amorphous synthetic polymers having a high glass transition temperature (Tg), from the standpoint of obtaining a cellulose fiber composite having excellent transparency and high durability. With respect to the degree of amorphousness, among those properties, polymers having a crystallinity of 10% or less, especially 5% or less, are preferred. With respect to Tg, polymers having a Tg of 110° C. or higher, especially 120° C. or higher, in particular 130° C. or higher, are preferred. In case where the matrix has a low Tg, there is a possibility that the composite might deform upon contact with, for example, hot water to pose a problem in practical use. From the standpoint of obtaining a cellulose composite having low water-absorbing properties, it is preferred to select a polymeric material in which the content of hydrophilic functional groups such as hydroxyl, carboxyl, and amino groups is low. Incidentally, the Tg of a polymer can be determined by a general method. For example, the Tg thereof is determined through an examination by DSC. The crystallinity of a polymer can be calculated from the density of amorphous regions and the density of crystalline regions, and can be calculated also through a dynamic viscoelasticity examination from tan δ, which is a ratio between modulus of elasticity and viscosity coefficient.

<Thermoplastic Resins>

Examples of thermoplastic resins include styrene resins, acrylic resins, aromatic polycarbonate resins, aliphatic polycarbonate resins, aromatic polyester resins, aliphatic polyester resins, aliphatic polyolefin resins, cycloolefin resins, polyamide resins, poly(phenylene ether) resins, thermoplastic polyimide resins, polyacetal resins, polysulfone resins, and amorphous fluororesins.

Examples of the styrene resins include polymers and copolymers of styrene, chlorostyrene, divinylbenzene, and α-methylstyrene.

Examples of the acrylic resins include polymers and copolymers of (meth)acrylic acid, (meth)acrylonitrile, (meth)acrylic esters, and (meth)acrylamide. The term "(meth)acrylic" herein means "acrylic and/or methacrylic".

The aromatic polycarbonate resins are copolymers which are produced by the reaction of one or more bisphenols that can contain a trihydric or higher phenol as a comonomer ingredient with a carbonic ester compound such as a bisalkyl carbonate, a bisaryl carbonate, or phosgene, and for which an aromatic dicarboxylic acid, such as terephthalic acid or isophthalic acid, or a derivative thereof (e.g., an aromatic dicarboxylic acid diester or an aromatic dicarboxylic acid chloride) may be used according to need as a comonomer ingredient for producing an aromatic polyester carbonate.

Since the modified cellulose of the invention is cellulose modified with aromatic-ring-containing substituents, the modified cellulose is thought to have satisfactory compatibility with aromatic polycarbonate resins, and aromatic polycarbonate resins are hence preferred.

Examples of the bisphenols include bisphenol A, bisphenol C, bisphenol E, bisphenol F, bisphenol M, bisphenol P, bisphenol S, and bisphenol Z (with respect to the abbreviations, reference was made to a reagent catalogue issued from Aldrich Chemical Co.). Preferred of these are bisphenol A and bisphenol Z (a bisphenol in which the central carbon atom takes part in a cyclohexane ring). Especially preferred is bisphenol A. Examples of the copolymerizable trihydric phenol include 1,1,1-(4-hydroxyphenyl)ethane and phloroglucinol.

The aliphatic polycarbonate resins are copolymers produced by the reaction of an aliphatic diol ingredient and/or an alicyclic diol ingredient with a carbonic ester compound such as a bisalkyl carbonate or phosgene. Examples of the alicyclic diol include cyclohexanedimethanol and isosorbide.

Examples of the aromatic polyester resins include copolymers of a diol, such as ethylene glycol, propylene glycol, or 1,4-butanediol, and an aromatic carboxylic acid such as terephthalic acid. Examples thereof further include copolymers of a diol, such as bisphenol A, and an aromatic carboxylic acid, e.g., terephthalic acid or isophthalic acid, such as polyarylates.

Since the modified cellulose of the invention is cellulose modified with aromatic-ring-containing substituents, the modified cellulose is thought to have satisfactory compatibility with aromatic polyester resins, and aromatic polyester resins are hence preferred.

Examples of the aliphatic polyester resins include copolymers of any of those diols and an aliphatic dicarboxylic acid, such as succinic acid or valeric acid, and copolymers of a hydroxydicarboxylic acid such as glycolic acid or lactic acid.

Examples of the aliphatic polyolefin resins include homopolymers of α-olefins having about 2-8 carbon atoms and bi- or terpolymers of any of these α-olefins with, for example, other α-olefin(s) having about 2-18 carbon atoms. Two or more of these olefin polymers may be used in combination.

The cycloolefin resins are polymers in which the polymer chain includes cycloolefin frameworks, such as norbornene or cyclohexadiene, or copolymers including these.

Examples of the polyamide resins include aliphatic amide resins, such as nylon-6,6, nylon-6, nylon-11, nylon-12, nylon-4,6, nylon-6,10, and nylon-6,12, and aromatic polyamides produced from an aromatic diamine, such as phenylenediamine, and an aromatic dicarboxylic acid or a derivative thereof, such as terephthaloyl chloride or isophthaloyl chloride.

Examples of the poly(phenylene ether) resins include poly (2,6-dimethyl-1,4-phenylene ether), poly(2-methyl-6-ethyl-1,4-phenylene ether), and poly(2,6-dichloro-1,4-phenylene ether), and further include copolymers of 2,6-dimethylphenol and other phenol compound(s).

Examples of the polyimide resins include pyromellitic acid type polyimides which are copolymers of pyromellitic anhydride and 4,4'-diaminodiphenyl ether or the like, trimellitic acid type polyimides which are copolymers produced from trimellitic anhydride, an aromatic diamine such as p-phenylenediamine, and a diisocyanate compound, biphenyl type polyimides produced from biphenyltetracarboxylic acid, 4,4'-diaminodiphenyl ether, and p-phenylenediamine or the like, benzophenone type polyimides produced from benzophenonetetracarboxylic acid and 4,4'-diaminodiphenyl ether or the like, and bismaleimide type polyimides produced from bismaleimide and 4,4'-diaminodiphenylmethane or the like.

Examples of the polyacetal resins include homopolymers having an oxymethylene structure as a unit structure and copolymers including an oxyethylene unit.

Examples of the polysulfone resins include copolymers of 4,4'-dichlorodiphenyl sulfone and bisphenol A or the like.

Examples of the amorphous fluororesins include homopolymers or copolymers of tetrafluoroethylene, hexafluoropropylene, chlorotrifluoroethylene, vinylidene fluoride, vinyl fluoride, perfluoroalkyl vinyl ethers, and the like.

One of these thermoplastic resins may be used alone, or two or more thereof may be used in combination.

<Curing Type Resins>

The terms "thermosetting resin" and "photocuring (actinic-energy-ray curing) type resin" mean a precursor which has not been cured or a cured resin which has been cured. The term "precursor" herein means a substance which is in a liquid, semi-solid, solid, or similar state at ordinary temperature and which is flowable at ordinary or elevated temperatures. Such substances can be caused to undergo a polymerization reaction and a crosslinking reaction by the action of a hardener, a catalyst, and heat or light to form a three-dimensional network structure while increasing in molecular weight, thereby giving insoluble infusible resins. The term "cured resin" means a resin obtained by curing the thermosetting resin precursor or the precursor for a photocuring (actinic-energy-ray curing) type resin.

<<Thermosetting Resins>>

Thermosetting resins in the invention are not particularly limited. Examples thereof include precursors for epoxy resins, acrylic resins, oxetane resins, phenolic resins, urea resins, melamine resins, unsaturated polyester resins, silicon resins, polyurethane resins, diallyl phthalate resins, and the like.

The term "epoxy resin precursor" means an organic compound having at least one epoxy group. The number of epoxy groups in the epoxy resin precursor is preferably 1-7 per molecule, more preferably 2 or more per molecule. The number of epoxy groups per molecule of a precursor can be determined by dividing the total number of epoxy groups contained in the epoxy resin precursor by the total number of molecules of the epoxy resin. The epoxy resin precursor is not particularly limited, and examples thereof include the epoxy resins and the like shown below. These epoxy resins may be used alone or in combination of two or more thereof. These epoxy resins are obtained by curing epoxy resin precursors using a hardener.

Examples of the epoxy resin precursors include precursors for aromatic epoxy resins and for products of the hydrogenation, bromination, etc. of these resins, alicyclic epoxy resins, aliphatic epoxy resins, glycidyl ester type epoxy resins and products of the hydrogenation thereof, glycidylamine type epoxy resins and products of the hydrogenation thereof, and copolymers of glycidyl (meth)acrylate and a radical-polymerizable monomer. Hardeners for use in the curing reaction of such epoxy resin precursors are not particularly limited, and examples thereof include amine compounds, compounds, such as polyaminoamide compounds, that are synthesized from amine compounds, tertiary amine compounds, imidazole compounds, hydrazide compounds, melamine compounds, acid anhydrides, phenol compounds, thermally latent cationic polymerization catalysts, photo-latent cationic polymerization initiators, and dicyanamide and derivatives thereof. These hardeners may be used alone or may be used in combination of two or more thereof.

Examples of the acrylic resin precursors include monofunctional (meth)acrylate compounds having one (meth)acryloyl group in the molecule, polyfunctional (meth)acrylate compounds having 2 or 3 (meth)acryloyl groups in the molecule, styrene compounds, acrylic acid derivatives, acrylate compounds having 4-8 (meth)acryloyl groups in the molecule, epoxy (meth)acrylate compounds, and (meth)acrylate compounds having a urethane bond.

Examples of the monofunctional (meth)acrylate compounds having one (meth)acryloyl group in the molecule include methyl (meth)acrylate, 2-hydroxyethyl (meth)acrylate, phenyl (meth)acrylate, benzyl (meth)acrylate, cyclohexyl (meth)acrylate, and alkyl (meth)acrylates in which the alkyl groups each have 1-30 carbon atoms.

In particular, mono(meth)acrylates having an alicyclic framework impart higher heat resistance and hence are suitable for use. Examples of the alicyclic-framework mono (meth)acrylate compounds include (hydroxy-acryloyloxy)tricyclo[5.2.1.0$^{2,6}$]decane, (hydroxy-methacryloyloxy)tricyclo[5.2.1.0$^{2,6}$]decane, (hydroxy-acryloyloxy)pentacyclo[6.5.1.1$^{3,6}$.0$^{2,7}$.0$^{9,13}$]pentadecane, (hydroxy-methacryloyloxy)pentacyclo[6.5.1.1$^{3,6}$.0$^{2,7}$.0$^{9,13}$]pentadecane, (hydroxymethyl-acryloyloxymethyl)tricyclo[5.2.1.0$^{2,6}$]decane, (hydroxymethyl-methacryloyloxymethyl)tricyclo[5.2.1.0$^{2,6}$]decane, (hydroxymethyl-acryloyloxymethyl)pentacyclo[6.5.1.1$^{3,6}$.0$^{2,7}$.0$^{9,13}$]pentadecane, (hydroxymethyl-methacryloyloxymethyl)pentacyclo[6.5.1.1$^{3,6}$.0$^{2,7}$.0$^{9,13}$]pentadecane, (hydroxyethyl-acryloyloxyethyl)tricyclo[5.2.1.0$^{2,6}$]decane, (hydroxyethyl-methacryloyloxyethyl)tricyclo[5.2.1.0$^{2,6}$]decane, (hydroxyethyl-acryloyloxyethyl)pentacyclo[6.5.1.1$^{3,6}$.0$^{2,7}$.0$^{9,13}$]pentadecane, and (hydroxyethyl-methacryloyloxyethyl)pentacyclo[6.5.1.1$^{3,6}$.0$^{2,7}$.0$^{9,13}$]pentadecane. Examples thereof further include mixtures of these compounds.

Examples of the polyfunctional (meth)acrylate compounds having 2 or 3 (meth)acryloyl groups in the molecule include alkylenediol di(meth)acrylates in which the alkylenes each have 1-30 carbon atoms such as ethylene glycol di(meth)acrylate, diethylene glycol di(meth)acrylate, triethylene glycol di(meth)acrylate, the di(meth)acrylates of tetraethylene glycol and higher polyethylene glycols, 1,3-butylene glycol di(meth)acrylate, 1,6-hexanediol di(meth)acrylate, neopentyl glycol di(meth)acrylate, 2-hydroxy-1,3-di(meth)acryloxypropane, 2,2-bis[4-(meth)acryloyloxyphenyl]propane, trimethylolpropane tri(meth)acrylate, bis(hydroxy)tricyclo[5.2.1.0$^{2,6}$]decane diacrylate, bis(hydroxy)tricyclo[5.2.1.0$^{2,6}$]dimethacrylate, bis(hydroxy)tricyclo[5.2.1.0$^{2,6}$]decane acrylate methacrylate, bis(hydroxy)pentacyclo[6.5.1.1$^{3,6}$.0$^{2,7}$.0$^{9,13}$]pentadecane diacrylate, bis(hydroxy)pentacyclo[6.5.1.1$^{3,6}$.0$^{2,7}$.0$^{9,13}$]pentadecane dimethacrylate, bis(hydroxy)pentacyclo[6.5.1.1$^{3,6}$.0$^{2,7}$.0$^{9,13}$]pentadecane acrylate methacrylate, 2,2-bis[4-(β-(meth)acryloyloxyethoxy)phenyl]propane, 2,2-bis[4-(β-(meth)acryloyloxyethoxyl)cyclohexyl]propane, and 1,4-bis[(meth)acryloyloxymethyl]cyclohexane.

Examples of the styrene compounds include styrene, chlorostyrene, divinylbenzene, and α-methylstyrene.

Examples of the (meth)acrylic acid derivatives other than esters include acrylamide, methacrylamide, acrylonitrile, and methacrylonitrile.

Suitable among those are bis(meth)acrylate compounds containing an alicyclic framework. Examples thereof include bis(acryloyloxy)tricyclo[5.2.1.0$^{2,6}$]decane, bis(methacryloyloxy)tricyclo[5.2.1.0$^{2,6}$]decane, (acryloyloxy-methacryloyloxy)tricyclo[5.2.1.0$^{2,6}$]decane, bis(acryloyloxy)pentacyclo[6.5.1.1$^{3,6}$.0$^{2,7}$.0$^{9,13}$]pentadecane, bis(methacryloyloxy)pentacyclo[6.5.1.1$^{3,6}$.0$^{2,7}$.0$^{9,13}$]pentadecane, (acryloyloxy-methacryloyloxy)pentacyclo[6.5.1.1$^{3,6}$.0$^{2,7}$.0$^{9,13}$]pentadecane, bis(acryloyloxymethyl)tricyclo[5.2.1.0$^{2,6}$]decane, bis(methacryloyloxymethyl)tricyclo[5.2.1.0$^{2,6}$]decane, (acryloyloxymethyl-methacryloyloxymethyl)tricyclo[5.2.1.0$^{2,6}$]decane, bis (acryloyloxymethyl)pentacyclo[6.5.1.1$^{3,6}$.0$^{2,7}$.0$^{9,13}$]pentadecane, bis(methacryloyloxymethyl)pentacyclo[6.5.1.1$^{3,6}$.0$^{2,7}$.0$^{9,13}$]pentadecane, (acryloyloxymethyl-methacryloyloxymethyl)pentacyclo[6.5.1.1$^{3,6}$.0$^{2,7}$.0$^{9,13}$]pentadecane, bis(acryloyloxyethyl)tricyclo[5.2.1.0$^{2,6}$]decane, bis(methacryloyloxyethyl)tricyclo[5.2.1.0$^{2,6}$]decane, (acryloyloxyethyl-methacryloyloxyethyl)tricyclo[5.2.1.0$^{2,6}$]decane, bis(acryloyloxyethyl)pentacyclo[6.5.1.1$^{3,6}$.0$^{2,7}$.0$^{9,13}$]pentadecane, bis(methacryloyloxyethyl)pentacyclo[6.5.1.1$^{3,6}$.0$^{2,7}$.0$^{9,13}$]pentadecane, (acryloyloxyethyl-methacryloyloxyethyl)pentacyclo[6.5.1.1$^{3,6}$.0$^{2,7}$.0$^{9,13}$]pentadecane, and mixtures of these.

Preferred of these are one or more compounds selected from bis(acryloyloxymethyl)tricyclo[5.2.1.0$^{2,6}$]decane, bis(methacryloyloxymethyl)tricyclo[5.2.1.0$^{2,6}$]decane, and (acryloyloxymethyl-methacryloyloxymethyl)tricyclo[5.2.1.0$^{2,6}$]decane. Some of these bis(meth)acrylates can be used in combination.

As the (meth)acrylates having 4-8 (meth)acryloyl groups in the molecule, use can be made of (meth)acrylic esters of polyols. Examples thereof include pentaerythritol tetra(meth)acrylate, pentaerythritol tri(meth)acrylate, dipentaerythritol hexa(meth)acrylate, dipentaerythritol penta(meth)acrylate, dipentaerythritol tetra(meth)acrylate, dipentaerythritol tri(meth)acrylate, tripentaerythritol octa(meth)acrylate, tripentaerythritol septi(meth)acrylate, tripentaerythritol hexa(meth)acrylate, tripentaerythritol penta(meth)acrylate, tripentaerythritol tetra(meth)acrylate, and tripentaerythritol tri(meth)acrylate.

Next, examples of the epoxy (meth)acrylates include bisphenol A type epoxy resins, bisphenol F type epoxy resins, phenol-novolac epoxy resins, compounds having an alicyclic epoxy group, bisphenol A type propylene oxide addition type terminal glycidyl ether, and products of the reaction of a fluorene epoxy resin or the like and (meth)acrylic acid.

Examples of the (meth)acrylates having a urethane bond in the molecule include urethane oligomers having 2-10 (preferably 2-5) (meth)acryloyl groups in the molecule. Examples thereof include a (meth)acryloyl-containing urethane oligomer produced by reacting a hydroxy-containing (meth)acrylate with a urethane prepolymer obtained by reacting a diol with a diisocyanate.

The (meth)acrylates having a urethane bond in the molecule each have a number-average molecular weight of preferably 1,000-100,000, more preferably 2,000-10,000. In particular, urethane acrylates having both methylenedicyclohexyl diisocyanate and polytetramethylene ether glycol are excellent from the standpoints of transparency, low birefringence, flexibility, etc., and are suitable for use.

Examples of the oxetane resin precursors include compounds having at least one oxetane ring. The number of oxetane rings in each of the oxetane resin precursors is preferably 1-4 per molecule. Examples of the compounds having one oxetane ring in the molecule include 3-ethyl-3-hydroxymethyloxetane, 3-ethyl-3-(phenoxymethyl)oxetane, 3-ethyl-3-(2-ethylhexyloxymethyl)oxetane, 3-ethyl{[-3-(triethoxyly)propoxy]methyl}oxetane, and 3-ethyl-3-methacryloxymethyloxetane. Examples of the compounds having two oxetane rings in the molecule include di[1-ethyl(3-oxetanyl)]methyl ether, 1,4-bis{[(3-ethyl-3-oxetanyl)methoxy]methyl}benzene, and 4,4'-bis[(3-ethyl-3-oxetanyl)methoxymehyl]biphenyl. Examples of the compounds having 3-4 oxetane rings include products of the reaction of a branched polyalkyleneoxy group or polysiloxy group with a 3-alkyl-3-methyloxetane.

Hardeners for use in the curing reaction of such oxetane resin precursors are not particularly limited, and examples thereof include amine compounds, compounds, such as polyaminoamide compounds, that are synthesized from amine compounds, tertiary amine compounds, imidazole compounds, hydrazide compounds, melamine compounds, acid anhydrides, phenol compounds, thermally latent cationic polymerization catalysts, photo-latent cationic polymerization initiators, and dicyanamide and derivatives thereof. These hardeners may be used alone or may be used in combination of two or more thereof. In particular, photohardeners are suitable from the standpoint of the effective utilization of energy. The photohardeners are compounds which initiate cationic polymerization upon irradiation with actinic energy rays. Examples thereof include diaryliodonium salts and triarylsulfonium salts.

Examples of the phenolic resin precursors include compounds obtained by reacting a phenol, e.g., phenol or cresol, with formaldehyde or the like to synthesize a novolac or the like and curing this compound with hexamethylenetetramine or the like.

Examples of the urea resin precursors include products of polymerization reactions between urea or the like and formaldehyde or the like.

Examples of the melamine resin precursors include products of polymerization reactions between melamine or the like and formaldehyde or the like.

Examples of the unsaturated polyester resin include resins obtained from an unsaturated polyester obtained from an unsaturated polybasic acid or the like and a polyhydric alcohol or the like, by dissolving the unsaturated polyester in a monomer polymerizable therewith and curing the solution.

Examples of the silicon resin precursors include compounds having an organopolysiloxane as the main framework.

Examples of the polyurethane resin precursors include products of polymerization reactions between a diol, e.g., a glycol, and a diisocyanate.

Examples of the diallyl phthalate resin precursors include products of reactions between a diallyl phthalate monomer and a diallyl phthalate prepolymer.

Hardeners and curing catalysts for those thermosetting resins are not particularly limited. Examples of the hardeners include polyfunctional amines, polyamides, acid anhydrides, and phenolic resins. Examples of the curing catalysts include imidazole. These can be used alone or as a mixture of two or more thereof.

<<Photocurable Resins>>

The photocurable resins in the invention are not particularly limited. Examples thereof include the precursors for epoxy resins, acrylic resins, oxetane resins, and other resins which were enumerated above in the explanation of thermosetting resins.

Hardeners for these photocurable resins are not particularly limited. Examples thereof include diaryliodonium salts and triarylsulfonium salts.

<<Other Ingredients>>

The thermosetting resins and photocurable resins described above each are suitably mixed with a chain transfer agent, ultraviolet absorber, filler, silane coupling agent, etc. and used as a curable composition.

(Chain Transfer Agents)

The curable composition may contain a chain transfer agent so that the reaction thereof proceeds evenly. For example, polyfunctional mercaptans having 2 or more thiol groups in the molecule can be used, and moderate toughness can be thus imparted to the cured object. It is preferred to use one or more mercaptan compounds selected from, for example, pentaerythritol tetrakis(β-thiopropionate), trimethylolpropane tris(β-thiopropionate), tris[2-(β-thiopropionyloxyethoxy)ethyl]triisocyanurate, and the like. In the case of using a mercaptan compound, the compound is incorporated in an amount of generally up to 30% by weight based on the total amount of the radical-polymerizable compounds.

(Ultraviolet Absorbers)

The curable composition may contain an ultraviolet absorber so that the cured object is prevented from discoloring. For example, the ultraviolet absorber is selected from benzophenone-based ultraviolet absorbers and benzotriazole-based ultraviolet absorbers. One such ultraviolet absorber may be used, or two or more such ultraviolet absorbers may be used in combination. In the case of using an ultraviolet absorber, the absorber is incorporated in an amount of generally 0.01-1 part by weight per 100 parts by weight of the radical-polymerizable compounds.

(Fillers Other Than Cellulose)

The composition may contain a filler other than cellulose fibers. Examples of the filler include inorganic particles and organic polymers. Specific examples thereof include inorganic particles such as silica particles, titania particles, and alumina particles, transparent cycloolefin polymers such as Zeonex (Nippon Zeon Co., Ltd.) and Paton (JSR Co., Ltd.), and general-purpose thermoplastic polymers such as polycarbonates and PMMA. Of these, silica particles of a nanometer size are suitable because transparency can be maintained when such silica particles are used. Furthermore, a polymer which is akin in structure to the ultraviolet-curable monomer is suitable because this polymer can be dissolved in a high concentration.

(Silane Coupling Agents)

A silane coupling agent may be added. Preferred silane coupling agents are, for example, γ-((meth)acryloxypropyl)trimethoxysilane, γ-((meth)acryloxypropyl)methyldimethoxysilane, γ-((meth)acryloxypropyl)methyldiethoxysilane, γ-((meth)acryloxypropyl)triethoxysilane, γ-(acryloxypropyl)trimethoxysilane, and the like, because these silane compounds have a (meth)acryloyl group in the molecule and can be copolymerized with other monomers. A silane coupling agent may be incorporated in an amount of generally 0.1-50% by weight, preferably 1-20% by weight, based on the total amount of radical-polymerizable compounds. In case where the amount thereof is too small, the effect of incorporation thereof is not sufficiently obtained. When the amount thereof is too large, there is a possibility that optical properties of the cured object, such as transparency, might be impaired.

<<Curing Step>>

The curable composition for forming the cellulose fiber composites of the invention can be polymerized/cured by a known method.

Examples thereof include heat curing and radiation curing. Preferred is radiation curing. Examples of the radiation include infrared rays, visible rays, ultraviolet rays, and electron beams. However, light is preferred. More preferred is light having a wavelength of about 200-450 nm. Even more preferred are ultraviolet rays having a wavelength of 300-400 nm.

Examples of the method include: a method in which a heat polymerization initiator which generates a radical upon heating is added beforehand to the curable composition and the composition is polymerized by heating (hereinafter sometimes referred to as "heat polymerization"); a method in which a photopolymerization initiator which generates a radical upon irradiation with radiation, e.g., ultraviolet rays, is added beforehand to the curable composition and the composition is polymerized by irradiation with the radiation (hereinafter sometimes referred to as "photopolymerization"), and a method in which a heat polymerization initiator and a photopolymerization initiator are added beforehand in combination and the composition is polymerized using heat and light in combination. In the invention, photopolymerization is more preferred.

As the photopolymerization initiator, a photo-radical generator is usually used. As the photo-radical generator, use can be made of known compounds which are known to be usable in this application. Examples thereof include benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. Preferred of these is 2,4,6-trimethylbenzoyldiphenylphosphine oxide. These photopolymerization initiators may be used alone or in combination of two or more thereof.

The amount of the photopolymerization initiator ingredient is 0.001 part by weight or more, preferably 0.01 part by weight or more, more preferably 0.05 parts by weight or more, per 100 parts by weight of all radical polymerizable compounds contained in the curable composition. The upper limit thereof is generally 1 part by weight or less, preferably 0.5 parts by weight or less, more preferably 0.1 part by weight or less. In case where the amount of the photopolymerization initiator added is too large, the polymerization proceeds rapidly and this not only enhances the birefringence of the resultant cured object but also impairs the hue thereof. For example, in case where the initiator amount is 5 parts by weight, absorption by the initiator prevents the light from reaching to the side opposite to the ultraviolet irradiation side, resulting in uncured areas. In addition, the composition yellows, and the cured object has a considerably deteriorated hue. On the other hand, in case where the amount thereof is too small, there is a possibility that polymerization might not proceed sufficiently even when ultraviolet irradiation is conducted.

A heat polymerization initiator may also be contained simultaneously. Examples thereof include hydroperoxides, dialkyl peroxides, peroxyesters, diacyl peroxides, peroxycarbonates, peroxyketals, and ketone peroxides. Specifically, use can be made of benzoyl peroxide, diisopropyl peroxycarbonate, t-butyl peroxy(2-ethylhexanoate)dicumyl peroxide, di-t-butyl peroxide, t-butyl peroxybenzoate, t-butyl hydroperoxide, diisopropylbenzene hydroperoxide, 1,1,3,3-tetramethylbutyl hydroperoxide, and the like. In case where heat polymerization is initiated during light irradiation, the polymerization is difficult to control. It is therefore preferred that such heat polymerization initiators should have a 1-minute half-life temperature of 120° C. or higher. Those polymerization initiators may be used alone or in combination of two or more thereof.

The amount of the radiation to be irradiated for curing is not limited so long as the photopolymerization initiator generates a radical. However, exceedingly small amounts thereof result in incomplete polymerization to give a cured object which does not have sufficient heat resistance and mechanical properties. Conversely, exceedingly large amounts thereof result in deteriorations of the cured object due to light, such as yellowing. Consequently, ultraviolet rays having a wavelength of 300-450 nm are irradiated in an amount preferably in the range of 0.1-200 J/cm$^2$, more preferably in the range of 1-20 J/cm$^2$, in accordance with the monomer composition and the kind and amount of the photopolymerization initiator. It is more preferred that radiation should be irradiated in installments. Specifically, when about 1/20 to 1/3 the overall irradiation amount is irradiated in the first operation and the remainder is irradiated in the second and succeeding operations, then a cured object having further reduced birefringence is obtained. Examples of usable lamps include a metal halide lamp, high-pressure mercury lamp, and ultraviolet LED lamp.

For the purpose of rapidly completing the polymerization, photopolymerization and heat polymerization may be simultaneously conducted. In this case, the curable composition is heated at a temperature in the range of 30-300° C. simultaneously with irradiation of radiation to cure the composition. Although a heat polymerization initiator may be added to the curable composition in order to complete the polymerization in this case, addition thereof in a large amount results in a cured object having enhanced birefringence and an impaired hue. Consequently, a heat polymerization initiator is used in an amount of generally 0.1-2% by weight, more preferably 0.3-1% by weight, based on the total amount of the monomers.

{Multilayer Structure}

A cellulose fiber composite obtained by the invention may be a multilayer structure composed of one or more layers of the cellulose sheet obtained by the invention and one or more planar structure layers constituted of any of the non-cellulosic polymers described above, or may be a multilayer structure composed of one or more layers of the cellulose sheet obtained by the invention and one or more layers of the polymer/cellulose composite obtained by the invention. There are no particular limitations on the number of superposed layers thereof and on the multilayer configuration thereof.

{Inorganic Film}

The cellulose fiber composites obtained by the invention each may be a composite that includes a polymer/cellulose composite layer on which an inorganic film has been superposed, or may be the multilayer structure described above which has an inorganic film superposed thereon, according to applications thereof.

The inorganic film to be used here is suitably determined according to applications of the cellulose fiber composite. Examples thereof include metals such as platinum, silver, aluminum, gold, and copper, silicon, ITO, $SiO_2$, SiN, $SiO_xN_y$, ZnO, and TFT. A combination thereof and a film thickness can be designed at will.

{Properties of the Cellulose Fiber Composites}

Suitable properties of the cellulose fiber composites obtained by the invention are explained below.

<Cellulose Content>

The cellulose fiber composites of the invention have a cellulose content of generally 1-99% by weight, and the content of non-cellulosic polymers therein is 1-99% by weight. For attaining a low coefficient of linear expansion, it is necessary that the content of cellulose should be 1% by weight or more and the content of non-cellulosic polymers should be 99% by weight or less. For attaining transparency, it is necessary that the content of cellulose should be 99% by weight or less and the content of non-cellulosic polymers should be 1% by weight or more. Preferred ranges are 5-90% by weight for cellulose and 10-95% by weight for non-cellulosic polymers. More preferred ranges are 10-80% by weight for cellulose and 20-90% by weight for non-cellulosic polymers. It is especially preferred that the content of cellulose should be 30-70% by weight and the content of non-cellulosic polymers should be 30-70% by weight.

The contents of cellulose and non-cellulosic polymers in a cellulose fiber composite can be determined, for example, from the weight of the cellulose before composite formation and the weight of the cellulose after composite formation. It is also possible to use a method in which the cellulose composite is immersed in a solvent in which the polymers are soluble to thereby remove the polymers only and the contents are determined from the weight of the residual cellulose. Other usable methods include a method in which the contents are determined from the specific gravity of the resin and a method in which the amounts of the functional groups of the resin and cellulose are determined by NMR or IR to determine the contents.

<Thickness>

The thickness of each of the cellulose fiber composites obtained by the invention is preferably 10 µm to 10 cm. By regulating the thickness thereof to such a value, the composites can be made to retain strength required of structural materials. The thickness of the cellulose fiber composites is more preferably 50 µm to 1 cm, even more preferably 80-250 µm.

The cellulose fiber composites obtained by the invention are, for example, in the form of a film or plate having such a thickness. However, the shape thereof is not limited to a flat film or flat plate, and the composites can be in the form of a film or plate having a curved surface. The composites may have any of other various shapes. Furthermore, the composites need not always have an even thickness, and the thickness thereof may differ partly.

<Coloration>

The cellulose fiber composites obtained by the invention have a low degree of coloration.

There are cases where cellulose yellows especially when a ligneous material was used as a raw material. Such discoloration may be due to discoloration of the cellulose itself and also to discoloration of non-cellulosic substances which remained depending on the degree of purification. In general, there are cases where cellulose does not discolor when present alone but discolors upon heating when combined with a polymer. The cellulose fibers and the polymer/cellulose composites obtained by the invention are less apt to discolor even through a heating step. The polymer/cellulose composites obtained by the invention have a YI, which indicates coloration, of preferably 20 or less, more preferably 15 or less, even more preferably 10 or less. YI can, for example, be measured with a color computer manufactured by Suga Test Instruments Co., Ltd.

<Haze>

The cellulose fiber composites obtained by the invention can be polymer/cellulose composites which have high transparency, i.e., a low haze. When the polymer/cellulose composites are to be used as various transparent materials, the haze thereof is preferably 20 or less, more preferably 10 or less. It is especially preferred that the value thereof should be 3 or less, in particular 1 or less.

<Total Light Transmittance>

The cellulose fiber composites obtained by the invention can be cellulose fiber composites having high transparency, i.e., a low haze. It is preferred that when the cellulose fiber composites are to be used as various transparent materials, the composites should have a total light transmittance, as measured along the thickness direction thereof in accordance with JIS K7105, of 60% or higher, desirably 70% or higher, especially 80% or higher, in particular 90% or higher. When the total light transmittance is less than 60%, there are cases where the composites are translucent or opaque and are difficult to use in applications where transparency is required. Total light transmittance can be measured by examining the cellulose composite having a thickness of, for example, 10-100 μm with a hazeometer manufactured by Suga Test Instruments Co., Ltd.; the value obtained with illuminant C is used.

<Coefficient of Linear Expansion>

The cellulose fiber composites obtained by the invention can be cellulose fiber composites with a low coefficient of linear expansion because of the use of cellulose fibers, which have a low coefficient of linear expansion (degree of elongation per K). The coefficient of linear expansion of the cellulose composites is preferably 1-50 ppm/K, more preferably 1-30 ppm/K, especially preferably 1-20 ppm/K.

In substrate applications, for example, inorganic thin-film transistors have a coefficient of linear expansion of about 15 ppm/K. Consequently, when such an inorganic film is superposed on and combined with a cellulose fiber composite having a coefficient of linear expansion exceeding 50 ppm/K, the two layers have a large difference in linear expansion coefficient, resulting in cracking, etc. It is therefore especially preferred that the coefficient of linear expansion of the cellulose composites should be 1-20 ppm/K.

The coefficient of linear expansion is measured by the method which will be described later in the section Examples.

<Tensile Strength>

The cellulose fiber composites obtained by the invention have a tensile strength of preferably 40 MPa or higher, more preferably 100 MPa or higher. In case where the tensile strength thereof is less than 40 MPa, sufficient strength is not obtained and this may affect use in applications where force is applied, such as, e.g., structural materials.

<Tensile Modulus>

The cellulose fiber composites obtained by the invention have a tensile modulus of preferably 0.2-100 GPa, more preferably 1-50 GPa, even more preferably 5.0-30 GPa. In case where the tensile modulus thereof is lower than 0.2 GPa, sufficient strength is not obtained and this may affect use in applications where force is applied, such as, e.g., structural materials.

<Crystallinity of the Cellulose>

The modified cellulose fibers contained in the cellulose fiber composites obtained by the invention have a cellulose I type crystal structure.

That a modified cellulose fiber has a I-type crystal structure can be ascertained from a diffraction profile (wide-angle X-ray diffraction image) thereof obtained through wide-angle X-ray diffractometry, the diffraction profile having characteristic peaks at two positions, i.e., at a scanning angle 2θ of around 14-17° and at a 2θ of around 22-23°.

On the other hand, in case where the cellulose I type crystal structure is damaged, a halo assigned to amorphous regions comes to be observed at around a 2θ of 18-19°. Also in the case of cellulose fibers having a crystal structure which is not the I-type, a peak is observed at around that angle.

The cellulose contained in the cellulose fiber composites of the invention satisfies that the ratio of the "average diffraction intensity in the scanning angle range of 18-19 degrees" (which reflects any structure(s), e.g., amorphous structure, other than I-type) to the "intensity of the diffraction peak assigned to a cellulose I type crystal structure in the scanning angle range of 20-24 degrees" is 0.8 or less. The ratio is preferably 0.7 or less, especially 0.6 or less, in particular 0.5 or less. The lower the intensity ratio, the better. Practically, however, the intensity ratio is about 0.01 or more.

In the case of the cellulose fiber composites, it is thought that signals assigned to the matrix overlap the diffraction profile, depending on the matrix material used. However, the same evaluation as for the cellulose sheet is rendered possible, for example, by conducting background subtraction using a profile obtained from the matrix material alone.

APPLICATIONS

The cellulose fiber composites obtained by the invention are highly transparent and have high strength, low water-absorbing properties, high transparency, low coloration, low haze, and excellent optical properties. The composites hence are suitable for use in displays, e.g., liquid-crystal displays, plasma displays, organic EL displays, field emission displays, and rear projection TVs, and as substrates and panels. The composites are suitable also as substrates for solar cells such as silicon-based solar cells and dye-sensitized solar cells. When the composites are to be used as substrates, a layer such as a barrier film, ITO, or TFT may be formed thereon. Furthermore, the composites are suitable for use as window materials for motor vehicles, window materials for railroad cars, window materials for dwelling houses, window materials for offices and factories, and the like. When the composites are to be used as window materials, a film such as a fluorocoating or a hardcoat film or a material having impact resistance and light resistance may be superposed thereon according to need.

The cellulose fiber composites can be used also as structural materials as applications other than transparent materials so as to take advantage of the properties thereof, such as a low coefficient of linear expansion, high modulus of elasticity, and high strength. In particular, the composites are suitable for use as automotive materials such as interior materials, exterior plates, and bumpers, the housings of personal computers, components of domestic electrical appliances, packaging materials, building materials, materials for civil engineering works, materials for fisheries, other industrial materials, etc.

EXAMPLES

The invention will be explained below in more detail by reference to Production Example, Examples, and Comparative Examples. However, the invention should not be construed as being limited to the following Examples unless the invention departs from the spirit thereof.

The heat decomposition temperature of the cellulose fibers obtained by the invention and the cellulose content, YI, haze, coefficient of linear expansion, and modulus of elasticity of each cellulose fiber composite were determined by the methods shown below.

[Degree of Chemical Modification of Modified Cellulose Fibers]

A 0.05-g portion of the modified cellulose fibers which had been dried was precisely weighed out, and 6 mL of methanol and 2 mL of distilled water were added thereto. This mixture was stirred at 60-70° C. for 30 minutes. Thereafter, 10 mL of a 0.05-N aqueous solution of sodium hydroxide was added thereto. The resultant mixture was stirred at 60-70° C. for 15 minutes and then further stirred at room temperature for a day. This mixture was titrated with a 0.02-N aqueous hydrochloric acid solution using phenolphthalein. The degree of chemical modification was calculated using the following equation.

The number of moles Q of the substituents introduced by the chemical modification is determined from the amount Z (mL) of the 0.02-N aqueous hydrochloric acid solution required for the titration, using the following equation.

$$Q \text{ (mol)} = 0.05 \text{ (N)} \times 10 \text{ (mL)}/1000 - 0.02 \text{ (N)} \times Z \text{ (mL)}/1000$$

A relationship between the number of moles Q of the substituents and the degree of chemical modification X (mol %) is calculated using the following equation (cellulose=$(C_6O_5H_{10})_n$=$(162.14)_n$; number of hydroxyl groups per repeating unit=3; molecular weight of OH=17). In the following, T is the molecular weight of the substituent.

$$\frac{\text{sample amount}}{162.14 + (T-17) \times \frac{3X}{100}} = \frac{Q}{\frac{3X}{100}} \quad [\text{Math. 3}]$$

This equation is solved as shown below.

$$x = \frac{100}{3} \times \frac{162.14 \times Q}{\{\text{sample amount} - Q \times (T-17)\}} \quad [\text{Math. 4}]$$

[Heat Decomposition Temperature of Cellulose Fibers]

Heat decomposition temperature was determined by regulating the moisture content of the cellulose sheet by placing the sheet at a temperature of 23° C. and a humidity of 50% for 48 hours or more and then subjecting this sheet to an examination with a TG-DTA (apparatus for simultaneously conducting differential thermal analysis and thermo-gravimetry) in which the sheet was heated from room temperature to 600° C. at 10° C./min in nitrogen to obtain a TG curve and the intersection of tangents determined from the TG curve was taken as the heat decomposition temperature.

[Average Fiber Diameter]

The fiber diameter of the cellulose fibers was determined through an examination with an optical microscope, SEM, TEM, or the like. Twelve fiber images were randomly extracted, and the thickest and the thinnest fiber images were excluded. The average for the remaining 10 fiber images was taken as average fiber diameter.

[Examination of Cellulose for Wide-Angle X-Ray Diffraction Image]

The cellulose sheet was examined using an X-ray generator ("PW1700", manufactured by PANanalytical B.V.) under the conditions of a target of Cu/Kα line, a monochromator, a voltage of 40 kV, a current of 30 mA, a scanning angle (2θ) range of 3.0-50.0°, and a step angle of 0.05°.

(Evaluation of Crystallinity)

The ratio of the "average diffraction intensity in the scanning angle range of 18-19 degrees" (which reflects any structure(s), e.g., amorphous structure, other than I-type) to the "intensity of the diffraction peak assigned to a cellulose I type crystal structure in the scanning angle range of 20-24 degrees" was determined.

[YI Value of Cellulose Sheet after Heating]

The cellulose sheet was heated in a 190° C. vacuum oven for 4 hours and then examined for YI value with a color computer manufactured by Suga Test Instruments Co., Ltd., in the reflection mode.

[Modulus of Elasticity of Cellulose Sheet and Strength Ratio thereof between before and after Heating]

The cellulose sheet was cut into a size having a width of 8 mm and a length of 50 mm. This test piece was subjected to a tensile test using tensile tester STA-1225, manufactured by Orientec Co., Ltd., under the conditions of a chuck-to-chuck distance of 25 mm and a test speed of 2 mm/min. A maximum strength was calculated from the strain-stress curve. Furthermore, the same cellulose sheet was heated in a 190° C. vacuum oven for 4 hours and then subjected to a tensile test in the same manner, and the modulus of elasticity and maximum strength thereof were calculated. The proportion of the tensile strength measured after the heating to the original tensile strength was determined. Although the cellulose sheet which was subjected to the measurement was a porous sheet, the calculations were made merely using the thickness and width of each sample. No correction or the like based on porosity was made.

[Cellulose Content of Cellulose Fiber Composite]

Cellulose content (% by weight) was determined from the weight of the cellulose sheet used for composite formation and from the weight of the cellulose composite.

[Thickness of Cellulose Fiber Composite]

Using a film thickness meter (PDN-20, manufactured by PEACOK), the cellulose fiber composite was examined with respect to ten various sites therein. The average thereof was employed.

[YI Value of Cellulose Fiber Composite]

YI value was measured using a color computer manufactured by Suga Test Instruments Co., Ltd.

[Haze of Cellulose Fiber Composite]

Haze value for illuminant C was measured with a hazeometer manufactured by Suga Test Instruments Co., Ltd.

[Total Light Transmittance of Cellulose Fiber Composite]

The composite obtained was examined for total light transmittance for illuminant C using a hazeometer manufactured by Suga Test Instruments Co., Ltd., in accordance with JIS K7105.

[Coefficient of Linear Expansion of Cellulose Fiber Composite]

The cellulose fiber composite was cut into a size of 3 mm (width) by 40 mm (length) with a laser cutter. This test piece was examined with TMA6100, manufactured by SII, in the tensile mode in a nitrogen atmosphere under the conditions of a chuck-to-chuck distance of 20 mm and a load of 10 g in the following manner. The test piece was heated from room temperature to 180° C. at 5° C./min, subsequently cooled from 180° C. to 25° C. at 5° C./min, and further heated from 25° C. to 180° C. at 5° C./min, and the coefficient of linear expansion was determined from the values measured in the range of 60° C. to 100° C. during the second heating.

[Tensile Modulus of Cellulose Fiber Composite]

The cellulose fiber composite was cut into a size of 10 mm (width) by 40 mm (length) with a laser cutter. This test piece was subjected to DMA (dynamic viscoelasticity) analysis using DMS6100, manufactured by SII Inc., in the tensile mode to determined storage modulus E' (unit: GPa) at a frequency of 10 Hz and 23° C.

Production Example 1

Wood flour (Oregon Pine 100, manufactured by Miyashita Co., Ltd.) was degreased with a 2% by weight aqueous solution of sodium carbonate at 80° C. for 6 hours. This wood flour was washed with desalted water and then delignified with sodium chlorite at 80° C. for 5.5 hours in the state of having been acidified with acetic acid. The delignified flour was washed with desalted water and then immersed in a 5% by weight aqueous solution of potassium hydroxide for 16 hours to remove hemicellulose therefrom. The resultant cellulose was washed with desalted water.

Example 1

A 10-g portion, on a solid basis, of the cellulose obtained in Production Example 1 was weighed out, and the water was replaced with acetic acid. Thereto were added 300 mL of acetic acid, 10 g of sodium acetate, and 21 g of benzoyl chloride. The resultant mixture was reacted at 80° C. for 5 hours with stirring. Thereafter, the liquid reaction mixture was filtered, washed with acetone, and then washed with a large amount of water until the washings became neutral.

The resultant benzoylated cellulose had a degree of chemical modification of 29 mol %, and had a heat decomposition temperature, as calculated through TG-DTA, of 354° C.

The modified cellulose obtained was mixed with water to prepare a 0.5% by weight aqueous suspension thereof. The suspension was introduced, through the feed material charging port, into stone mill type grinder Supermasscolloider MKCA 6-2, manufactured by Masuko Sangyo Co., Ltd., which employed stone mill GC 6-80 and had a gap of 80 μm and a rotation speed of 1,500 rpm. The treated cellulose dispersion which had been passed through the grinder was introduced again into the feed material charging port. The cellulose dispersion was passed through the grinder twice in total. Thereafter, the dispersion was passed through an ultra-high-pressure homogenizer (Ultimizer, manufactured by Sugino Machine Ltd.) at 245 MPa ten times.

This cellulose fiber dispersion was diluted with water to a concentration of 0.13% by weight, and 150 g of the diluted dispersion was introduced into a filter having a diameter of 90 mm and employing PTFE having a pore diameter of 1 μm. At the time when the solid concentration reached about 5% by weight, 2-propanol was introduced for replacement. The filtration required 38 minutes before completion thereof. Thereafter, the cellulose fibers were dried at 120° C. for 5 minutes with pressing at 0.14 MPa to obtain a white cellulose sheet (basis weight, about 40 g/m$^2$). This cellulose sheet had an average fiber diameter, as calculated through an SEM examination of the sheet surface, of 18 nm. From a wide-angle X-ray diffraction image, the cellulose fibers were ascertained to have a cellulose I type crystal structure.

This cellulose sheet was immersed in a solution prepared by mixing 96 parts by weight of bis(methacryloyloxymethyl)tricyclo[5.2.1.0$^{2,6}$]decane with 6 parts by weight of pentaerythritol tetrakis(β-thiopropionate), 0.05 parts by weight of 2,4,6-trimethylbenzoyldiphenylphosphine oxide (Lucirin TPO, manufactured by BASF), and 0.05 parts by weight of benzophenone, and was held under vacuum overnight. This cellulose sheet was sandwiched between two glass plates and irradiated with ultraviolet rays using an electrodeless mercury lamp ("D BulB", manufactured by Fusion UV Systems, Inc.) at an irradiance of 400 mW/cm$^2$ and a line speed of 7 m/min. The amount of radiation in this operation was 0.12 J/cm$^2$. This operation was conducted twice while reversing the glass surface. The glass surfaces after the ultraviolet irradiation had a temperature of 25° C.

Subsequently, the cellulose sheet sandwiched between glass plates was irradiated with ultraviolet rays at an irradiance of 1,900 mW/cm$^2$ and a line speed of 2 m/min. The amount of radiation in this operation was 2.7 J/cm$^2$. This operation was conducted 8 times while reversing the glass surface. The glass surfaces after the ultraviolet irradiation had a temperature of 44° C. The amount of radiation was 21.8 J/cm$^2$. After completion of the ultraviolet irradiation, the cellulose sheet was separated from the glass plates and heated in a 190° C. vacuum oven for 4 hours to obtain a composite material. Incidentally, with respect to the irradiance of ultraviolet rays, the irradiance of ultraviolet rays of 320-390 nm was measured at 23° C. with ultraviolet irradiance meter "UV-M02", manufactured by ORC Manufacturing Co., Ltd., using attachment "UV-35".

The properties of this cellulose fiber composite are shown in Table 1 together with the properties of the cellulose sheet.

Example 2

A 10-g portion, on a solid basis, of the cellulose obtained in Production Example 1 was weighed out, and the water was replaced with acetic acid. Thereto were added 300 mL of acetic acid, 12 g of sodium acetate, and 25 g of benzoyl chloride. The resultant mixture was reacted at 80° C. for 5 hours with stirring. Thereafter, the liquid reaction mixture was filtered, washed with acetone, and then washed with a large amount of water until the washings became neutral.

The resultant benzoylated cellulose had a degree of chemical modification of 39 mol %, and had a heat decomposition temperature, as calculated through TG-DTA, of 350° C.

The modified cellulose obtained was mixed with water to prepare a 0.5% by weight aqueous suspension thereof. The suspension was introduced, through the feed material charging port, into stone mill type grinder Supermasscolloider MKCA 6-2, manufactured by Masuko Sangyo Co., Ltd., which employed stone mill GC 6-80 and had a gap of 80 μm and a rotation speed of 1,500 rpm. The treated cellulose dispersion which had been passed through the grinder was introduced again into the feed material charging port. The cellulose dispersion was passed through the grinder twice in total. Thereafter, the dispersion was passed through an ultra-high-pressure homogenizer (Ultimizer, manufactured by Sugino Machine Ltd.) at 245 MPa ten times.

This cellulose fiber dispersion was diluted with water to a concentration of 0.13% by weight, and 150 g of the diluted dispersion was introduced into a filter having a diameter of 90 mm and employing PTFE having a pore diameter of 1 μm. At the time when the solid concentration reached about 5% by weight, 2-propanol was introduced for replacement. The filtration required 20 minutes before completion thereof. Thereafter, the cellulose fibers were dried at 120° C. for 5 minutes with pressing at 0.14 MPa to obtain a white cellulose sheet (basis weight, about 40 g/m$^2$). This cellulose sheet had an average fiber diameter, as calculated through an SEM examination of the sheet surface, of 15 nm.

From a wide-angle X-ray diffraction image, the cellulose fibers were ascertained to have a cellulose I type crystal structure.

This cellulose sheet was used to obtain a cellulose fiber composite in the same manner as in Example 1. The properties of this cellulose fiber composite are shown in Table 1 together with the properties of the cellulose sheet.

Example 3

The cellulose dispersion obtained in Example 1 was further subjected to an ultrasonic treatment with ultrasonic homogenizer UH-600S, manufactured by SMT Co., Ltd. (frequency, 20 kHz; effective output density, 22 W/cm$^2$).

Using a straight type chip having a diameter of 36 mm (made of a titanium alloy), tuning was conducted at an output volume of 8. The ultrasonic treatment was conducted for 30 minutes using an optimal tuning position. The treatment was conducted while cooling the cellulose dispersion with 5° C. cold water from outside the treatment vessel and while stirring the dispersion with a magnetic stirrer.

The ultrasonic-treated dispersion was subjected to 10-minute centrifugal separation at 18,000 rpm (38,900 G) to obtain a supernatant. This supernatant cellulose fiber dispersion was used to obtain a cellulose sheet in the same manner as in Example 1. The filtration required 53 minutes before completion thereof. Thereafter, the cellulose fibers were dried at 120° C. for 5 minutes with pressing at 0.1.4 MPa to obtain a white cellulose sheet (basis weight, about 40 g/m²). This cellulose sheet had an average fiber diameter, as calculated through an SEM examination of the sheet surface, of 14 nm. From a wide-angle X-ray diffraction image, the cellulose fibers were ascertained to have a cellulose I type crystal structure.

This cellulose sheet was used to obtain a cellulose fiber composite in the same manner as in Example 1.

The properties of this cellulose fiber composite are shown in Table 1 together with the properties of the cellulose sheet.

Example 4

The cellulose dispersion obtained in Example 2 was subjected to an ultrasonic treatment in the same manner as in Example 3. The ultrasonic-treated dispersion was subjected to 10-minute centrifugal separation at 18,000 rpm (38,900 G) to obtain a supernatant. This supernatant cellulose fiber dispersion was used to obtain a cellulose sheet in the same manner as in Example 1. The filtration required 51 minutes before completion thereof. Thereafter, the cellulose fibers were dried at 120° C. for 5 minutes with pressing at 0.14 MPa to obtain a white cellulose sheet (basis weight, about 40 g/m²). This cellulose sheet had an average fiber diameter, as calculated through an SEM examination of the sheet surface, of 12 nm. From a wide-angle X-ray diffraction image, the cellulose fibers were ascertained to have a cellulose I type crystal structure.

This cellulose sheet was used to obtain a cellulose fiber composite in the same manner as in Example 1.

The properties of this cellulose fiber composite are shown in Table 1 together with the properties of the cellulose sheet.

Example 5

A 10-g portion, on a solid basis, of the cellulose obtained in Production Example 1 was weighed out, and the water was replaced with acetic acid. Thereto were added 300 mL of acetic acid, 5 g of sodium acetate, and 12.5 g of benzoyl chloride. The resultant mixture was reacted at 80° C. for 5 hours with stirring. Thereafter, the liquid reaction mixture was filtered, washed with acetone, and then washed with a large amount of water until the washings became neutral.

The resultant benzoylated cellulose had a degree of chemical modification of 11 mol %, and had a heat decomposition temperature, as calculated through TG-DTA, of 339° C.

The modified cellulose obtained was mixed with water to prepare a 0.5% by weight aqueous suspension thereof. The suspension was introduced, through the feed material charging port, into stone mill type grinder Supermasscolloider MKCA 6-2, manufactured by Masuko Sangyo Co., Ltd., which employed stone mill GC 6-80 and had a gap of 80 μm and a rotation speed of 1,500 rpm. The treated cellulose dispersion which had been passed through the grinder was introduced again into the feed material charging port. The cellulose dispersion was passed through the grinder twice in total. Thereafter, the dispersion was passed through an ultra-high-pressure homogenizer (Ultimizer, manufactured by Sugino Machine Ltd.) at 245 MPa ten times.

This cellulose dispersion was diluted with water to a concentration of 0.13% by weight, and 150 g of the diluted dispersion was introduced into a filter having a diameter of 90 mm and employing PTFE having a pore diameter of 1 μm. At the time when the solid concentration reached about 5% by weight, 2-propanol was introduced for replacement. The filtration required 102 minutes before completion thereof. Thereafter, the cellulose fibers were dried at 120° C. for 5 minutes with pressing at 0.14 MPa to obtain a white cellulose sheet (basis weight, about 40 g/m²). This cellulose sheet had an average fiber diameter, as calculated through an SEM examination of the sheet surface, of 18 nm. From a wide-angle X-ray diffraction image, the cellulose fibers were ascertained to have a cellulose I type crystal structure.

This cellulose sheet was used to obtain a cellulose fiber composite in the same manner as in Example 1.

The properties of this cellulose fiber composite are shown in Table 1 together with the properties of the cellulose sheet.

Comparative Example 1

The cellulose obtained in Production Example 1 was mixed with water to prepare a 0.5% by weight aqueous suspension thereof. The suspension was introduced, through the feed material charging port, into stone mill type grinder Supermasscolloider MKCA 6-2, manufactured by Masuko Sangyo Co., Ltd., which employed stone mill GC 6-80 and had a gap of 80 μm and a rotation speed of 1,500 rpm. The treated cellulose dispersion which had been passed through the grinder was introduced again into the feed material charging port. The cellulose dispersion was passed through the grinder twice in total. Thereafter, the dispersion was passed through an ultrahigh-pressure homogenizer (Ultimizer, manufactured by Sugino Machine Ltd.) at 245 MPa ten times.

The cellulose had a heat decomposition temperature, as calculated through TG-DTA, of 296° C.

This cellulose fiber dispersion was diluted with water to a concentration of 0.13% by weight, and 150 g of the diluted dispersion was introduced into a filter having a diameter of 90 mm and employing PTFE having a pore diameter of 1 μm. At the time when the solid concentration reached about 5% by weight, 2-propanol was introduced for replacement. The filtration required 149 minutes before completion thereof. Thereafter, the cellulose fibers were dried at 120° C. for 5 minutes with pressing at 0.14 MPa to obtain a white cellulose sheet (basis weight, about 40 g/m²). This cellulose sheet had an average fiber diameter, as calculated through an SEM examination of the sheet surface, of 25 nm. From a wide-angle X-ray diffraction image, the cellulose fibers were ascertained to have a cellulose I type crystal structure.

This cellulose sheet was used to obtain a cellulose fiber composite in the same manner as in Example 1.

The properties of this cellulose fiber composite are shown in Table 1 together with the properties of the cellulose sheet.

Comparative Example 2

Follow-up Experiment of Example 6 of JP-A-2007-51266

A cellulose sheet was obtained in the same manner as in Comparative Example 1. This cellulose sheet was placed in a laboratory dish containing a reaction liquid composed of acetic anhydride and acetic acid in a ratio of 9:1 (by volume), and the reaction liquid was infiltrated into inner parts of the sheet at room temperature for 30 minutes within a desiccator at a reduced pressure. The pressure was returned to ordinary pressure, and the cellulose sheet was allowed to stand in the dark at room temperature for 5 days in a nitrogen atmosphere. After the reaction, the cellulose sheet was taken out, washed with methanol and desalted water in this order, and finally subjected to replacement with 2-propanol. Thereafter, the cellulose sheet was dried at 120° C. for 5 minutes with pressing at 0.14 MPa to obtain a white cellulose sheet. This cellulose sheet had an average fiber diameter, as calculated through an SEM examination of the sheet surface, of 25 nm.

This acetylated cellulose had a degree of chemical modification of 7 mol %, and had a heat decomposition temperature, as calculated through TG-DTA, of 331° C. From a wide-angle X-ray diffraction image, the acetylated cellulose was ascertained to have a cellulose I type crystal structure.

This cellulose sheet was used to obtain a cellulose fiber composite in the same manner as in Example 1.

The properties of this cellulose fiber composite are shown in Table 1 together with the properties of the cellulose sheet.

Comparative Example 3

Follow-up Experiment of Example 11 of JP-A-2008-274461

A 1.4-g portion, on a solid basis, of the cellulose obtained in Production Example 1 was weighed out, and the water was replaced with ethyl Cellosolve. This cellulose was mixed with a solution prepared by dissolving 25 g of β-naphthoic acid in 400 mL of ethyl Cellosolve, and the resultant mixture was reacted at 80° C. for 4 hours with stirring in nitrogen. After cooling, the cellulose was taken out by filtration, washed with ethyl Cellosolve, and then washed with water.

This naphthoyl-modified cellulose had a degree of chemical modification of 1.3 mol %, showing that the naphthoyl modification had proceeded little. This cellulose had a heat decomposition temperature, as calculated through TG-DTA, of 319° C. The results are shown in Table 1.

Comparative Example 4

Example 1 of JP-A-2008-274461 was Carried Out Using phenyl isocyanate in Place of the 4-biphenyl isocyanate Manila hemp was purified by the method shown in Production Example 1. A 0.63-g portion, on a solid basis, of the resultant cellulose was weighed out, and the water was replaced with dimethylformamide. This cellulose was mixed with 65 mL of dimethylformamide and 11.5 g of phenyl isocyanate, and the resultant mixture was reacted at 115° C. for 2 hours with stirring in nitrogen. After cooling, the cellulose was taken out by filtration and washed with water and methanol. A wide-angle X-ray diffraction image revealed that the cellulose I type crystal structure had not been maintained, and that the ratio of the "average diffraction intensity in the scanning angle range of 18-19 degrees" (which reflects any structure(s), e.g., amorphous structure, other than I-type) to the "intensity of the diffraction peak assigned to a cellulose I type crystal structure in the scanning angle range of 20-24 degrees" was 1.11, showing that the cellulose had become amorphous. The cellulose had a heat decomposition temperature, as calculated through TG-DTA, of 258° C. The results are shown in Table 1.

TABLE 1

| | Degree of chemical modification (%) | Filtration period (min) | Heat decomposition temperature (° C.) | Average fiber diameter (nm) | Crystallinity | YI of sheet after heating | Sheet strength ratio between before and after heating (%) | Modulus of elasticity of sheet after heating (GPa) |
|---|---|---|---|---|---|---|---|---|
| Example 1 | 29 | 38 | 354 | 18 | 0.43 | 24.5 | 102 | 4.0 |
| Example 2 | 39 | 20 | 350 | 15 | 0.49 | 18.5 | 103 | 4.5 |
| Example 3 | 29 | 53 | 354 | 14 | 0.42 | 32.9 | 105 | 6.7 |
| Example 4 | 39 | 51 | 350 | 12 | 0.48 | 14.8 | 103 | 4.7 |
| Example 5 | 11 | 102 | 339 | 18 | 0.35 | 30.1 | 99 | 4.2 |
| Comparative Example 1 | 0 | 149 | 296 | 25 | 0.26 | 92.5 | 106 | 3.3 |
| Comparative Example 2 | 7 | 149 | 331 | 25 | 0.37 | 33.3 | 80 | 3.9 |
| Comparative Example 3 | 1.3 | — | 313 | — | — | — | — | — |
| Comparative Example 4 | — | — | 258 | — | 1.11 | — | — | — |

| | Composite Material | | | | | | |
|---|---|---|---|---|---|---|---|
| | Cellulose content (wt %) | Thickness (μm) | YI after heating | Haze | Total light transmittance (%) | Coefficient of linear expansion (ppm/K) | Tensile modulus (GPa) |
| Example 1 | 56 | 57 | 4.7 | 1.6 | 90.7 | 17 | 5.9 |
| Example 2 | 45 | 62 | 3.6 | 2.8 | 90.5 | 24 | 6.4 |
| Example 3 | 45 | 72 | 6.3 | 0.62 | 90.7 | 21 | 5.1 |
| Example 4 | 44 | 73 | 13 | 0.62 | 90.9 | 22 | 8.3 |
| Example 5 | 49 | 64 | 8.4 | 1.3 | 90.8 | 17 | 6.3 |
| Comparative Example 1 | 51 | 65 | 40 | 2.2 | 90.2 | 21 | 4.5 |
| Comparative Example 2 | 38 | 74 | 38 | 30 | 90.5 | 16 | 3.8 |
| Comparative Example 3 | — | — | — | — | — | — | — |
| Comparative Example 4 | — | — | — | — | — | — | — |

The modified cellulose fibers shown in Examples 1 to 5 obtained according to the invention each had an improved heat decomposition temperature as compared with the unmodified cellulose fibers shown in Comparative Example 1, the acetylated cellulose modified with aliphatic-containing substituents shown in Comparative Example 2, and the cellulose modified with aromatic-ring-containing substituents by conventional methods shown in Comparative Examples 3 and 4. A comparison between the properties of heated cellulose sheets shows the following. Examples 1 to 5 each retained a sheet strength ratio as high as 99% or more and simultaneously showed a tensile modulus as high as 4 GPa or above. In contrast, Comparative Example 1 had a tensile modulus as low as 3 GPa odd although the sheet strength thereof was maintained. Comparative Example 2 had a considerably reduced tensile strength although the tensile modulus thereof improved to a little under 4 GPa. These differences are observed also as differences in tensile modulus among composite materials; the composite materials of Examples 1 to 5 each showed a clearly improved tensile modulus as compared with the composite materials of Comparative Examples 1 and 2.

A comparison in filtration period necessary for obtaining a cellulose sheet from an aqueous cellulose dispersion obtained in the same fibrillation step shows the following. It can be seen from Examples 1, 2, and 5 and Comparative Example 1 that the Examples, in which cellulose had been modified with aromatic-ring-containing substituents, had a shorter filtration period than in the case of the unmodified cellulose and attained a haze equal to or higher than that of the unmodified cellulose. Incidentally, filtration period is more important in industrial production. Since larger amounts of cellulose dispersions are treated by vacuum or pressure filtration having a smaller pressure difference, a difference in filtration period becomes an exceedingly large difference.

It can be seen from Examples 3 and 4 that highly transparent composite materials were obtained because of the ultrasonic treatment.

In Comparative Example 2, which was a follow-up experiment of the Example 6 of JP-A-2007-51266, a cellulose sheet was modified with acetyl groups, which are aliphatic. However, since the modification was conducted after a sheet of unmodified cellulose had been produced, not only the effect of shortening filtration period was not obtained but also no improvement in thermal discoloration was observed, resulting in impaired transparency.

In Comparative Example 3, cellulose was modified with aromatic-containing groups by an esterification method, which is different from the process of the present invention. However, reactivity was low and the modification proceeded little. The increase in heat decomposition temperature was smaller than in Comparative Example 2. It is hence presumed that various properties including sheet strength retention after heating and tensile modulus are lower than the levels attained in the Examples according to the invention. Consequently, even when the cellulose of Comparative Example 3 is formed into a sheet to obtain a cellulose fiber composite, this composite material is not thought to have various properties, including tensile modulus, that reach the levels attained in the Examples according to the invention.

In Comparative Example 4 also, cellulose was modified with aromatic carbamate groups by a method different from the process of the invention. However, the cellulose I type crystals were not maintained. It is presumed that the cellulose of Comparative Example 4, in which the proportion of the I-type crystal structure was low, suffers a considerable decrease in strength as compared with Comparative Examples 1 to 3. It is not thought that various properties including sheet strength retention after heating and tensile modulus reach the levels attained in the Examples according to the invention. Consequently, even when the cellulose of Comparative Example 4 is formed into a sheet to obtain a cellulose fiber composite, this composite material is not thought at all to have various properties, including tensile modulus, that reach the levels attained in the Examples according to the invention.

Examples 1 to 5 according to the invention retained the I-type crystal structure despite the fact that surface hydroxyl groups of the cellulose had been modified with aromatic-ring-containing groups at a probability exceeding 10%. The production process of the invention is considered to be a process for efficiently introducing aromatic-containing groups while maintaining the cellulose I type crystals.

The effects of the invention, which include the heat resistance of a cellulose sheet and the YI, tensile modulus, etc. of composite materials formed therefrom, are thought to have been accomplished by both the degree of chemical modification and the I-type crystal structure.

A comparison in average cellulose fiber diameter between Examples 1 and 2 and Comparative Example 1 in Table 1 shows that Examples 1 and 2 have a smaller value than Comparative Example 1 despite the fact that the cellulose had undergone the same fibrillation step. It is presumed from these results that the invention rendered even chemical modification possible by using an organic acid during chemical modification to thereby effectively swell the cellulose fibers and that the invention has thus attained both the degree of chemical modification and the I-type crystal structure.

Although the reactions for modified-cellulose formation shown in the Examples were conducted in acetic acid, which is an organic acid, the cellulose in each Example showed satisfactory suitability for fibrillation. It can hence be considered that cellulose modified with aromatic-ring-containing substituents is easy to fibrillate and has high productivity. With respect to the properties of the cellulose composites employing cellulose sheets obtained from the cellulose fibers, the composites were highly transparent and attained colorlessness, a low coefficient of linear expansion, and a high modulus of elasticity, as described above.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 12, 2009 (Application No. 2009-140697), the entire contents thereof being incorporated herein by reference.

INDUSTRIAL APPLICABILITY

The cellulose fiber composites obtained by the production processes of the invention are highly transparent and have high strength, low water-absorbing properties, high transparency, low coloration, low haze, and excellent optical properties. The composites hence are suitable for use in displays, e.g., liquid-crystal displays, plasma displays, organic EL displays, field emission displays, and rear projection TVs, and as substrates and panels. The composites are suitable also as substrates for solar cells such as silicon-based solar cells and dye-sensitized solar cells. When the composites are to be used as substrates, a layer such as a barrier film, ITO, or TFT may be formed thereon. Furthermore, the composites are suitable for use as window materials for motor vehicles, window materials for railroad cars, window materials for dwelling houses, window materials for offices and factories, and the like. When the composites are to be used as window materials, a film such as a fluorocoating or a hardcoat film or a material having impact resistance and light resistance may be superposed thereon according to need.

The cellulose fiber composites can be used also as structural materials as applications other than transparent materials so as to take advantage of the properties thereof, such as a low coefficient of linear expansion, high modulus of elasticity, and high strength. In particular, the composites are suitable for use as automotive materials such as interior materials, exterior plates, and bumpers, the housings of personal computers, components of domestic electrical appliances, packaging materials, building materials, materials for civil engineering works, materials for fisheries, other industrial materials, etc.

The invention claimed is:

1. A sheet of modified cellulose fibers which comprises cellulose fibers having an average fiber diameter of 100 nm or less and having a cellulose I type crystal structure in which 10% to 60% by mole of all hydroxyl groups of the cellulose have been modified with an aromatic-ring-containing substituent,
   - wherein the sheet of modified cellulose fibers have a haze value measured with illuminant C of 3 or less
   - wherein said haze value is measured after making a composite material by: immersing the cellulose fiber sheet having a thickness regulated so that the sheet has a basis weight of 40 g/m², in a solution prepared by mixing 96 parts by weight of bis(methacryloyloxymethyl)tricyclo[5.2.1.0²,⁶]decane with 6 parts by weight of pentaerythritol tetrakis(β-thiopropionate), 0.05 parts by weight of 2,4,6-trimethylbenzoyldiphenylphosphine oxide, and 0.05 parts by weight of benzophenone; holding the sheet under vacuum overnight; subsequently sandwiching the sheet between two glass plates; performing a curing using an electrodeless mercury lamp; thereafter separating the sheet from the glass plates; and then heating the sheet in a 190° C. vacuum oven for 4 hours,
   - wherein the aromatic ring of each aromatic-ring-containing substituent is bonded to the cellulose by a connecting group selected from the group consisting of an ester group, an ether group and a carbamate group;
   - the aromatic-ring-containing substituent is a substituent derived from an aromatic hydrocarbon compound, a heterocyclic aromatic compound, or a non-benzenoid aromatic compound;
   - the aromatic-ring-containing substituent each may be configured of two or more moieties of any of the aromatic hydrocarbon compound, the heterocyclic aromatic compound, and the non-benzenoid aromatic compound, the moieties having been connected to each other with a single bond or an alkyl group having 1-3 carbon atoms; and
   - the aromatic-ring-containing substituent may be one in which hydrogen atom thereof has been replaced with an alkyl group having 1-12 carbon atoms.

2. The sheet of modified cellulose fibers according to claim 1, wherein the cellulose fibers give a wide-angle X-ray diffraction image in which the ratio of the "average diffraction intensity in the scanning angle range of 18-19 degrees" to the "intensity of a diffraction peak derived from cellulose I type crystals in the scanning angle range of 20-24 degrees", is 0.8 or less,
   - wherein the aromatic ring of each aromatic-ring-containing substituent is bonded to the cellulose by one connecting group selected from the group consisting of an ester group, an ether group and a carbamate group such that the aromatic-ring-containing substituent has a structure selected from the group consisting of one of the following formulae (1) to (3):

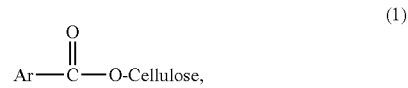

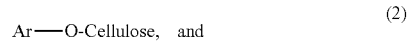

- wherein Ar is selected from the group consisting of an aromatic hydrocarbon compound, a heterocyclic aromatic compound, and a non-benzenoid aromatic compound; and
   - wherein Ar is unsubstituted or a hydrogen atom of said Ar is replaced with an alkyl group having 1-12 carbon atoms.

3. The sheet of modified cellulose fibers according to claim 1, wherein the modified cellulose fibers have an average fiber diameter of 80 nm or less.

4. The sheet of modified cellulose fibers according to claim 1, wherein the modified cellulose fibers have an average fiber diameter of 4 nm to 100 nm.

5. A cellulose fiber composite which comprises a matrix and the sheet of modified cellulose fibers according to claim 1.

6. The sheet of modified cellulose fibers according to claim 1, wherein 11% to 60% by mole of all hydroxyl groups of the cellulose have been modified with an aromatic-ring-containing substituent.

7. The sheet of modified cellulose fibers according to claim 1, wherein 15% to 60% by mole of all hydroxyl groups of the cellulose have been modified with an aromatic-ring-containing substituent.

8. The sheet of modified cellulose fibers according to claim 1, wherein 10% to 55% by mole of all hydroxyl groups of the cellulose have been modified with an aromatic-ring-containing substituent.

9. The sheet of modified cellulose fibers according to claim 1, wherein 10% to 50% by mole of all hydroxyl groups of the cellulose have been modified with an aromatic-ring-containing substituent.

10. The sheet of modified cellulose fibers according to claim 1, wherein 10% to 45% by mole of all hydroxyl groups of the cellulose have been modified with an aromatic-ring-containing substituent.

11. The sheet of modified cellulose fibers according to claim 1, wherein 10% to 40% by mole of all hydroxyl groups of the cellulose have been modified with an aromatic-ring-containing substituent.

12. The sheet of modified cellulose fibers according to claim 1, wherein the haze value measured with illuminant C is 2 or less.

13. The sheet of modified cellulose fibers according to claim 1, wherein the haze value measured with illuminant C is 1 or less.

14. The sheet of modified cellulose fibers according to claim 1, wherein the thickness of the sheet ranges from 1 μm to 1,000 μm.

15. The sheet of modified cellulose fibers according to claim 14, wherein the thickness of the sheet is at least 5 μm.

16. The sheet of modified cellulose fibers according to claim 14, wherein the thickness of the sheet is at most 250 μm.

* * * * *